(12) United States Patent
Shankar et al.

(10) Patent No.: US 11,537,996 B2
(45) Date of Patent: *Dec. 27, 2022

(54) INTERACTIVE DATA ANALYSIS AND SCHEDULING

(71) Applicant: Palantir Technologies Inc., Denver, CO (US)

(72) Inventors: Ankit Shankar, San Francisco, CA (US); Casey Patton, London (GB); Christopher Wynnyk, Washington, DC (US); Kayo Teramoto, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,497

(22) Filed: Mar. 25, 2022

(65) Prior Publication Data

US 2022/0215349 A1 Jul. 7, 2022

Related U.S. Application Data

(63) Continuation of application No. 16/924,066, filed on Jul. 8, 2020, now Pat. No. 11,301,816.

(60) Provisional application No. 62/873,373, filed on Jul. 12, 2019.

(51) Int. Cl.
*G06Q 10/10* (2012.01)
*G06F 3/0482* (2013.01)

(52) U.S. Cl.
CPC ....... *G06Q 10/1093* (2013.01); *G06F 3/0482* (2013.01)

(58) Field of Classification Search
CPC ................. G06Q 10/1093; G06F 3/0482
See application file for complete search history.

(56) References Cited

U.S. PATENT DOCUMENTS

| | | | | |
|---|---|---|---|---|
| 8,160,233 | B2 * | 4/2012 | Keren | H04M 3/5175 379/265.09 |
| 8,321,257 | B2 * | 11/2012 | Motoyama | G06Q 10/06 705/7.22 |
| 10,437,707 | B2 * | 10/2019 | Blandford | G06F 11/3664 |
| 11,301,816 | B1 | 4/2022 | Shankar et al. | |

(Continued)

*Primary Examiner* — Daeho D Song
(74) *Attorney, Agent, or Firm* — Knobbe, Martens, Olson & Bear, LLP

(57) ABSTRACT

A data analysis system is disclosed that receives data from a master data system to enable useful and efficient rescheduling of items, taking into account effects of various rescheduling options on various metrics related to the items and/or the scheduling. The data analysis system includes sophisticated data analysis and interactive graphical user interface functionality to enable efficient, multi-variable evaluation of various rescheduling options. The interactive graphical user interface includes interactive functionality for suggesting rescheduling options in view of the effects of those changes on various metrics, evaluating various rescheduling options in view of effects on the various metrics, adjusting instances of metrics related to items/timelines in view of scheduling changes, and the like. Once a set of schedule modifications are determined by the data analysis system, the data analysis system can push the schedule modifications back to the master data system for implementation.

20 Claims, 14 Drawing Sheets

(56) References Cited

U.S. PATENT DOCUMENTS

| | | | |
|---|---|---|---|
| 2004/0109137 A1* | 6/2004 | Bubie | H04N 21/41415 348/E7.063 |
| 2005/0062935 A1* | 3/2005 | Bubie | H04N 7/165 348/E7.063 |
| 2007/0139418 A1* | 6/2007 | Abel | G06T 13/20 345/474 |
| 2008/0086329 A1* | 4/2008 | Hertel | G16Z 99/00 705/2 |
| 2008/0294663 A1* | 11/2008 | Heinley | G11B 27/34 715/764 |
| 2009/0287522 A1* | 11/2009 | Motoyama | G06Q 10/1097 705/7.21 |
| 2009/0287718 A1* | 11/2009 | Motoyama | G06Q 10/109 |
| 2009/0287730 A1* | 11/2009 | Motoyama | G06Q 10/109 707/999.102 |
| 2009/0320032 A1* | 12/2009 | Avni | G06F 9/5083 718/103 |
| 2011/0072434 A1* | 3/2011 | Avni | G06F 9/4881 718/102 |
| 2011/0115413 A1* | 5/2011 | Erickson | H05B 47/155 315/312 |
| 2011/0271220 A1* | 11/2011 | Remsberg | G06Q 10/06 715/772 |
| 2012/0166432 A1* | 6/2012 | Tseng | G06F 16/9535 707/E17.084 |
| 2012/0239451 A1* | 9/2012 | Caligor | G06Q 10/00 705/7.21 |
| 2013/0290008 A1* | 10/2013 | Rosenblum | G16H 10/20 705/2 |
| 2017/0317938 A1* | 11/2017 | Abraham | H04L 47/24 |
| 2018/0130554 A1* | 5/2018 | Cheng | G06Q 10/0633 |
| 2018/0249113 A1* | 8/2018 | Faulkner | H04N 21/47 |
| 2019/0050812 A1* | 2/2019 | Boileau | G06F 3/0484 |
| 2020/0279014 A1* | 9/2020 | Lenzner | G06F 40/106 |
| 2020/0302562 A1* | 9/2020 | Trim | G06Q 90/205 |

* cited by examiner

Change Log

| | | |
|---|---|---|
| Change | Movement A | Movement B |
| 502 { ⋮ | Item 1 ←——→ | Item 2 |

504 { Items : [Pinned] All

506 { [Summary] Metric 1 Metric 2

| Item | Metric 1 | Metric 2 |
|---|---|---|
| 1 | [0][0][4] → [0][2][2] | [0][0][40] → [3][6][31] |
| 2 | [1][1][10] → [2][2][8] | [1][1][30] → [4][8][20] |
| 3 | [0][2][10] | [5][7][52] |
| 4 | [0][0][8] | [8][1][32] |
| ⋮ | | |
| Total | [1][3][32] → [2][6][28] | [14][9][154] → [20][22][135] |

508 encompasses the item rows through Total.

Change Log

| Change | Movement A | Movement B |
|---|---|---|
| ⋮ | Item 1 ⟷ | Item 2 |

510 {

Items : [ Pinned ]  All

Summary [ Metric 1 ]  Metric 2

Total Tasks : [1][3][32] → [2][6][28]

512 {

| Item | Event | Days Remaining | Categorization |
|---|---|---|---|
| 1 | Event 1 | 2 | Possible |
| 1 | Event 2 | 5 | Possible |
| 2 | Event 3 | 2 | Possible |
| 2 | Event 4 | 2 | Needs Review |

FIG. 5B

INTERACTIVE DATA ANALYSIS AND SCHEDULING

CROSS-REFERENCE TO RELATED APPLICATIONS

This application is a continuation of U.S. patent application Ser. No. 16/924,066, filed Jul. 8, 2020, and titled "INTERACTIVE DATA ANALYSIS AND SCHEDULING," which application claims benefit of U.S. Provisional Patent Application No. 62/873,373, filed Jul. 12, 2019, and titled "INTERACTIVE DATA ANALYSIS AND SCHEDULING." The entire disclosure of each of the above items is hereby made part of this specification as if set forth fully herein and incorporated by reference for all purposes, for all that it contains.

BACKGROUND

A data system may include multiple types of data, spread across numerous data stores and/or databases, each of which may comprise data in different formats. Some of that data may include data related to time-sensitive scheduling of a large number of items. Some of that data may include various metrics related to the items and/or the scheduling. For various reasons, it may be desirable or needed to modify the schedule of the items. Various options for rescheduling of the items may have various effects, positive or negative, across the various metrics. However, due to the disparate data stores, databases, and formats, the data system may not be capable of enabling a holistic evaluation of the effects of various rescheduling options. Additionally, even if the relevant data could be combined and evaluated, the large number of variables, and the variables' effects on one another, can create an exponentially complicated problem when evaluating rescheduling options. Accordingly, it may be technically unfeasible to enable useful or efficient rescheduling of items using the data system.

SUMMARY

A "data analysis system" is disclosed that receives data from a master data system to enable useful and efficient rescheduling of items, taking into account effects of various rescheduling options on various metrics related to the items and/or the scheduling. Data of two general types are received by the data analysis system and from the master data system: time-sensitive data (e.g., schedule data), and other data (e.g., various types of metric data). As compared to the other data, the time-sensitive data may be received more frequently, and may be processed more frequently, by the data analysis system, to provide more efficient use of resources and more sensitive up-to-date information for managing rescheduling. Other data may be received and processed relatively less frequently, as slightly less up-to-date, e.g., metric data may have a relatively smaller impact on rescheduling evaluation (e.g., as compared to the effect slightly less up-to-date scheduling data may have).

The data analysis system includes sophisticated data analysis and interactive graphical user interface functionality to enable efficient, multi-variable evaluation of various rescheduling options. The interactive graphical user interface may include functionality for selecting a subset of the items, selecting a relevant time frame for rescheduling evaluation of the subset of items, and selecting a primary metric evaluating the rescheduling options. The interactive graphical user interface may generally include three additional portions: a first portion with a plurality of timelines each associated with a different one of the subset of items, and with indications of instances of the primary metric located relative to the timelines; a second portion with calculated metric information associated with a selected part of a timeline or a selected indication of an instance of the primary metric; and a third portion with a log of scheduling changes, and a summary of the effects of the scheduling changes on various metrics. The interactive graphical user interface includes interactive functionality for suggesting rescheduling options in view of the effects of those changes on various metrics, evaluating various rescheduling options in view of effects on the various metrics, adjusting instances of metrics related to items/timelines in view of scheduling changes, and the like.

Once a set of schedule modifications are determined by the data analysis system, the data analysis system can push the schedule modifications back to the master data system for implementation. Accordingly, the data analysis system can enable efficient solutions to the complex problem of rescheduling of items, taking into account various metrics, and using data from potentially disparate data sources.

Accordingly, in various implementations, large amounts of data are automatically and dynamically calculated interactively in response to user inputs, and the calculated data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various implementations of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of information and may enable a user to more quickly access, navigate, assess, and digest such information than previous systems.

In some implementations, data may be presented in graphical representations, such as visual representations, such as timelines, charts, and graphs, where appropriate, to allow the user to comfortably review the large amount of data and to take advantage of humans' particularly strong pattern recognition abilities related to visual stimuli. In some implementations, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various implementations of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various implementations of the disclosure provide significant improvements over such technology. Additionally, various implementations of the present disclosure are inextricably tied to computer technology. In particular, various implementations rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various implementations cannot reasonably be performed by humans alone, without the computer technology upon which they are implemented. Further, the implementation of the various implementations of the present disclosure via computer technology enables many of the advantages described herein, including more efficient interaction with, and presentation of, various types of electronic data.

In certain implementations, a computer-implemented method comprises, by one or more processors executing program instructions: receiving a first set of data from a source data system, the first set of data comprising at least schedule data indicating a schedule of a set of items; receiving a second set of data from the source data system, the second set of data including at least metric data related to the set of items; receiving one or more modifications to the schedule of the set of items via an interactive graphical user interface; generating schedule update data based at least in part on the one or more modifications to the schedule; and communicating the schedule update data to the source data system.

The method of the preceding paragraph can be implemented together with any combination of the following features, among others: by the one or more processors executing program instructions, periodically or intermittently receiving updates to the first set of data from the source data system, periodically or intermittently receiving updates to the second set of data from the source data system, and updating the interactive graphical user interface in response to receiving at least the updates to the first set of data; the updates to the first set of data are received more frequently than the updates to the second set of data, due at least in part to a time-sensitivity of the first set of data relative to the second set of data.

Moreover, the methods of the preceding paragraphs can be implemented together with any combination of the following features, among others: by the one or more processors executing program instructions, generating user interface data useable for rendering the interactive graphical user interface, the interactive graphical user interface including at least, a first user interface portion including at least a plurality of timelines generated based at least in part on a subset of the schedule data associated with a selected subset of the items; by the one or more processors executing program instructions, receiving a first user input, via the first user interface portion, selecting a first part of a first timeline of a first item, determining possible schedule change options from others of the plurality of timelines of the selected subset of the items, indicating or highlighting, in the first user interface portion, parts of the plurality of timelines to indicate the determined possible schedule change options, if any, and in response to a second user input indicating a selection of a schedule change option associated with a second part of a second timeline of a second item, determining modifications to the schedules associated with the first item and the second item to effectuate the selected schedule change, and updating at least the first user interface portion to indicate changes to the schedules associated with the first item and the second item in view of the selected schedule change; by the one or more processors executing program instructions, generating the schedule update data and/or communicating the schedule update data to the source data system are initiated in response to a third user input; the first user interface portion further includes at least one or more indications of instances of a selected metric, wherein the one or more indications are spatially located adjacent to timelines of items to which the respective instances of the selected metric relate; the one or more indications are configured to provide a visual representation of whether or not the respective instances of the selected metric are associated with parts of timelines of items; by the one or more processors executing program instructions, in response to determining modifications to schedules in response to selection of a schedule change option, determining updates to the one or more indications of instances of the selected metric, and updating at least the first user interface portion to indicate the updates to the updates to the one or more indications; timeline comprises groupings of the selected subset of items based on at least one of user indication of items to pin, results of a search query, a list of all items of a group of related items; the groupings are separately sortable and/or filterable.

Moreover, the methods of the preceding paragraphs can be implemented together with any combination of the following features, among others: the interactive graphical user interface further includes at least, a second user interface portion including at least calculated metric information associated with a selected part of the timeline or a selected indication of an instance of a selected metric; the calculated metric information is associated with a selected part of the timeline comprising a selected movement of an item, and wherein the computer-implemented method further comprises, by the one or more processors executing program instructions, determining, for the selected movement, one or more possible schedule change options from others of the plurality of timelines of the selected subset of the items, calculating updated metric information associated with each of the one or more possible change options, and including in the second user interface portion a listing of the possible schedule change options and the associated updated metric information associated with each; the updated metric information is provided at least in part as one or more colored shapes with overlaid numerical indicators indicating effects of the one or more possible schedule change options on various metrics; the calculated metric information is associated with a first selected indication of an instance of a selected metric, the first selected indication of the instance of the selected metric is associated with a point in time and a third item, but not associated with a part of a timeline of the third item, and the computer-implemented method further comprises, by the one or more processors executing program instructions, determining, for each of a plurality of subsequent parts of the timeline of the third item, a suitability of the subsequent part of the timeline for association with first selected indication of the instance of the selected metric, and including in the second user interface portion a listing or graph of the plurality of subsequent parts of the timeline of the third item and the associated determined suitabilities associated with each.

Moreover, the methods of the preceding paragraphs can be implemented together with any combination of the following features, among others: the interactive graphical user interface further includes at least a third user interface portion including at least a log of modifications to the schedule of the set of items; the third user interface portion further includes at least a summary of calculated metric information including a comparison of the calculated metric information before the modifications to the schedule and after the modifications to the schedule; the comparison of the calculated metric information is provided at least in part as one or more colored shapes with overlaid numerical indicators indicating effects of the modification to the schedule on various metrics.

Additional implementations of the disclosure are described below in reference to the appended claims, which may serve as an additional summary of the disclosure.

In various implementations, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

FIGS. 3A-3C illustrate example interactive graphical user interfaces, according to various implementations of the present disclosure.

FIGS. 5A-5B illustrate example interactive graphical user interfaces, according to various implementations of the present disclosure.

DETAILED DESCRIPTION

I. Overview

Figure 1A:
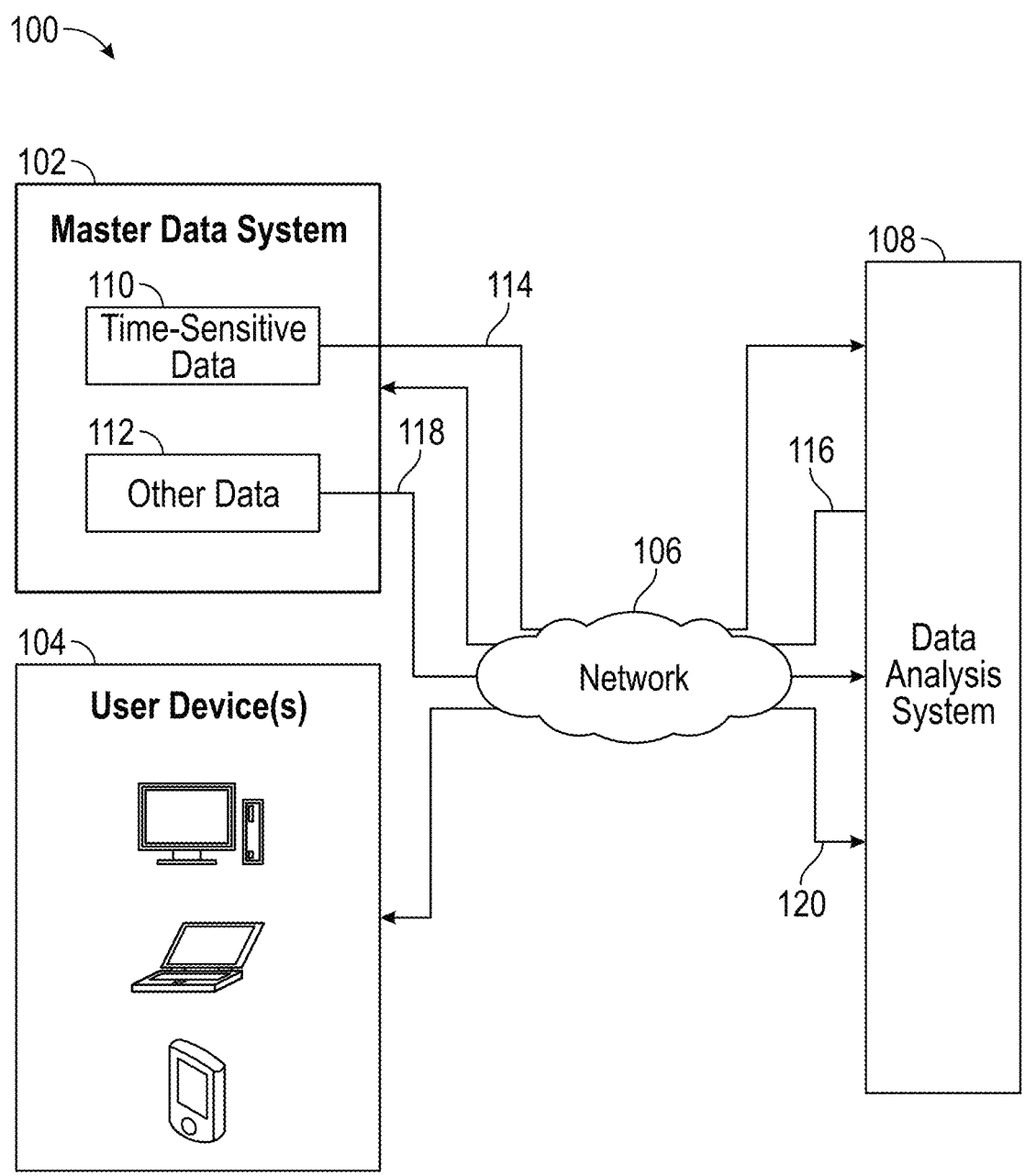
FIG. 1A illustrates a block diagram of an example operating environment in which one or more aspects of the present disclosure may operate, according to various implementations of the present disclosure.

A data system (for convenience, herein referred to as a "master data system" or a "source data system") may include multiple types of data, spread across numerous data stores and/or databases, each of which may comprise data in different formats. Some of that data may include data related to time-sensitive scheduling of a large number of items. Some of that data may include various metrics related to the items and/or the scheduling. For various reasons, it may be desirable or needed to modify the schedule of the items. Various options for rescheduling of the items may have various effects, positive or negative, across the various metrics. However, due to the disparate data stores, databases, and formats, the master data system may not be capable of enabling a holistic evaluation of the effects of various rescheduling options. Additionally, even if the relevant data could be combined and evaluated, the large number of variables, and the variables' effects on one another, can create an exponentially complicated problem when evaluating rescheduling options. Accordingly, it may be technically unfeasible to enable useful or efficient rescheduling of items using the master data system.

A "data analysis system" is provided that receives data from the master data system to enable useful and efficient rescheduling of items, taking into account effects of various rescheduling options on various metrics related to the items and/or the scheduling. Data of two general types are received by the data analysis system and from the master data system: time-sensitive data (e.g., schedule data), and other data (e.g., various types of metric data). As compared to the other data, the time-sensitive data may be received more frequently, and may be processed more frequently, by the data analysis system, to provide more efficient use of resources and more sensitive up-to-date information for managing rescheduling. Other data may be received and processed relatively less frequently, as slightly less up-to-date, e.g., metric data may have a relatively smaller impact on rescheduling evaluation (e.g., as compared to the effect slightly less up-to-date scheduling data may have).

The data analysis system includes sophisticated data analysis and interactive graphical user interface functionality to enable efficient, multi-variable evaluation of various rescheduling options. The interactive graphical user interface may include functionality for selecting a subset of the items, selecting a relevant time frame for rescheduling evaluation of the subset of items, and selecting a primary metric evaluating the rescheduling options. The interactive graphical user interface may generally include three additional portions: a first portion with a plurality of timelines each associated with a different one of the subset of items, and with indications of instances of the primary metric located relative to the timelines; a second portion with calculated metric information associated with a selected part of a timeline or a selected indication of an instance of the primary metric; and a third portion with a log of scheduling changes, and a summary of the effects of the scheduling changes on various metrics. The interactive graphical user interface includes interactive functionality for suggesting rescheduling options in view of the effects of those changes on various metrics, evaluating various rescheduling options in view of effects on the various metrics, adjusting instances of metrics related to items/timelines in view of scheduling changes, and the like.

Once a set of schedule modifications are determined by the data analysis system, the data analysis system can push the schedule modifications back to the master data system for implementation. Accordingly, the data analysis system can enable efficient solutions to the complex problem of rescheduling of items, taking into account various metrics, and using data from potentially disparate data sources.

II. Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Item: As used in relation to data item analysis, scheduling, and other aspects of the present disclosure, in addition to its ordinary and customary meaning, the term "item" includes all types of physical and/or non-physical items that may be scheduled, routed, and/or the like. Examples of items, which may or may not be applicable in various implementations of the present disclosure, include trucks, automobiles, airplanes, trains, construction equipment, raw materials, parts, goods, manufactured objects, and/or the like. "Items" may also be referred to herein as "physical items", "physical objects", and/or the like.

Metric: As used in relation to data item analysis, items, scheduling, and other aspects of the present disclosure, in addition to its ordinary and customary meaning, the term "metric" includes all types of events, properties, metadata, and/or other related data and information. Examples of metrics, which may or may not be applicable in various implementations of the present disclosure, include maintenance events, passenger or goods connections, movement restrictions, driver or crew assignments, passenger or goods seats or locations, delays, costs, and/or the like.

III. Example Operating Environment

FIG. 1A illustrates a block diagram of an example operating environment 100 in which one or more aspects of the present disclosure may operate, according to various implementations of the present disclosure. The operating environment 100 may include a master data system 102, one or more user devices 104, and a data analysis system 108. The various devices may communicate with one another via, e.g., a communications network 106, as illustrated.

In general, the master data system 102 (also referred to herein as a "source data system") may comprise a computing system, including a plurality of data stores, databases, memories, processors, network interfaces, and the like, by which scheduling of a large number of items is managed. The master data system 102 may gather data, from multiple data sources, related to items and metrics associated with those items, and may provide means for scheduling the items. The master data system 102 may further communicate the schedules to other computer systems so as to implement the scheduling.

For example, in an implementation the master data system 102 may gather data related to scheduling of trucks (e.g., "items") that are tasked with transporting goods across a large geographical area. The trucks may each move goods from one depot to another, along a route with multiple stops, loading and unloading goods along the way. Scheduling of the trucks may include determining routes, including starting and ending depots, for each of the trucks. Scheduling of the trucks may further include receiving and/or determining various metrics related to the scheduling, such as tracking and/or planning for maintenance of the trucks, and ensuring that the trucks arrive at depots where particular maintenance tasks may be performed, within certain timeframes. The truck schedule information may be communicated to other computer systems, e.g., computers in local offices, smartphone of drivers or personnel, and/or the like, to allow for implementation of the schedules.

In general, the data of the master data system 102 may be categorized into two groups: time-sensitive data 110 and other data 112. Time-sensitive data 110 generally includes schedule data, but may include any other data that is important for creating or updating a schedule of items. For example, continuing the truck scheduling example, information regarding the current schedule of the trucks, and any changes made to that schedule, may be time-sensitive data because a created or updated schedule may be invalid if very up-to-date data is not in the system. Other data 112 may include any data that is not time-sensitive data, and may include, for example, various types of metric data. Accordingly, the time-sensitive data 110 may generally be more time-sensitive, relative to the other data 112, for scheduling purposes.

In another example, the master data system 102 may gather data related to scheduling of goods or parts (e.g., "items") themselves, which scheduling may have various characteristics similar to those of the example of scheduling trucks described above.

For various reasons, it may be desirable or needed to modify a schedule of the items in the master data system 102. For example, continuing the truck scheduling example, if a truck breaks down or requires unexpected maintenance or a driver change, the schedule may need to be modified to reassign trucks among various routes. Similar, in the goods/parts example, due to various changes to demand or manufacturing requirements, the schedule may need to be modified to reassign goods or parts among various routes or destinations. In general, modification of a schedule may create various disruptions and/or affect various metrics associated with the schedule and the items. Thus, it may be advantageous to modify the schedule so as to optimize for, or at least effectively account for the effect on, certain metrics. The master data system 102 may not provide capabilities to perform such re-scheduling. Accordingly, data may be communicated to data analysis system 108, and the data analysis system 108 may provide such capabilities.

In particular, in an implementation the time-sensitive data 110 and the other data 112 may each be communicated from the master data system 102 (i.e., from the source data system) to the data analysis system 108 via network 106, where the data may be processed and analyzed as further described herein to generate updated schedules. The time-sensitive data 110 and the other data 112 may be communicated to the data analysis system 108 periodically, intermittently, according to a schedule, on demand, as data is updated/changed, and/or according to any other suitable scheme or combination of the foregoing. As indicated in FIG. 1A, the time-sensitive data 110 and the other data 112 may be separately communicated to the data analysis system 108 (e.g., via routes 114 and 118). For example, the time-sensitive data 110 may be communicated to the data analysis system 108 more frequently than the other data 112. Separate communications may advantageously enable the data analysis system 108 to more efficiently receive, and/or to prioritize receipt of and/or processing of, information that is most time-sensitive for creating/updating a schedule. In some implementations, time-sensitive data 110 may be updated and/or communicated to the data analysis system 108 on the order of milliseconds, second, or minutes, while the other data 112 may be updated and/or communicated to the data analysis system 108 on the order of seconds, minutes, tens of minutes, or hours. Differing communications schedules may apply to different types of the other data 112.

The data analysis system 108 may communicate (e.g., via route 120) with various user device(s) 104, via network 106, to provide various interactive graphical user interfaces for updating schedules of items, and described herein in detail. In some implementations, the features and services provided by the data analysis system 108 may be implemented as web services consumable via the network 106. In further implementations, the data analysis system 108 is provided by one or more virtual machines implemented in a hosted computing environment, as further described below. The hosted computing environment may include one or more rapidly provisioned and released computing resources, which computing resources may include computing, networking and/or storage devices.

Generated and/or updated schedules, and/or changes/modifications to the schedule (e.g., data comprising updates or changes to the schedule previously communicated to the data analysis system 108), are communicated from the data analysis system 108 back to the master data system 102 (i.e., the source data system), via the network 106 (e.g., via route 116). The schedule modifications received by the master data system 102 may then be implemented by the master data system 102 as described above.

Various example user devices 104 are shown in FIG. 1A, including a desktop computer, a laptop, and a mobile phone, each provided by way of illustration. In general, the user devices 104 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 104 may execute an application (e.g., a browser, a stand-alone application, etc.) that allows a user to access and interact with interactive graphical user interfaces as described herein.

The network 106 may include any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some implementations, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Further details and examples regarding the implementations, operation, and functionality, including various interactive graphical user interfaces, of the various components of the example operating environment 100 are described herein in reference to various figures.

IV. Example Data Analysis System

Figure 1B:
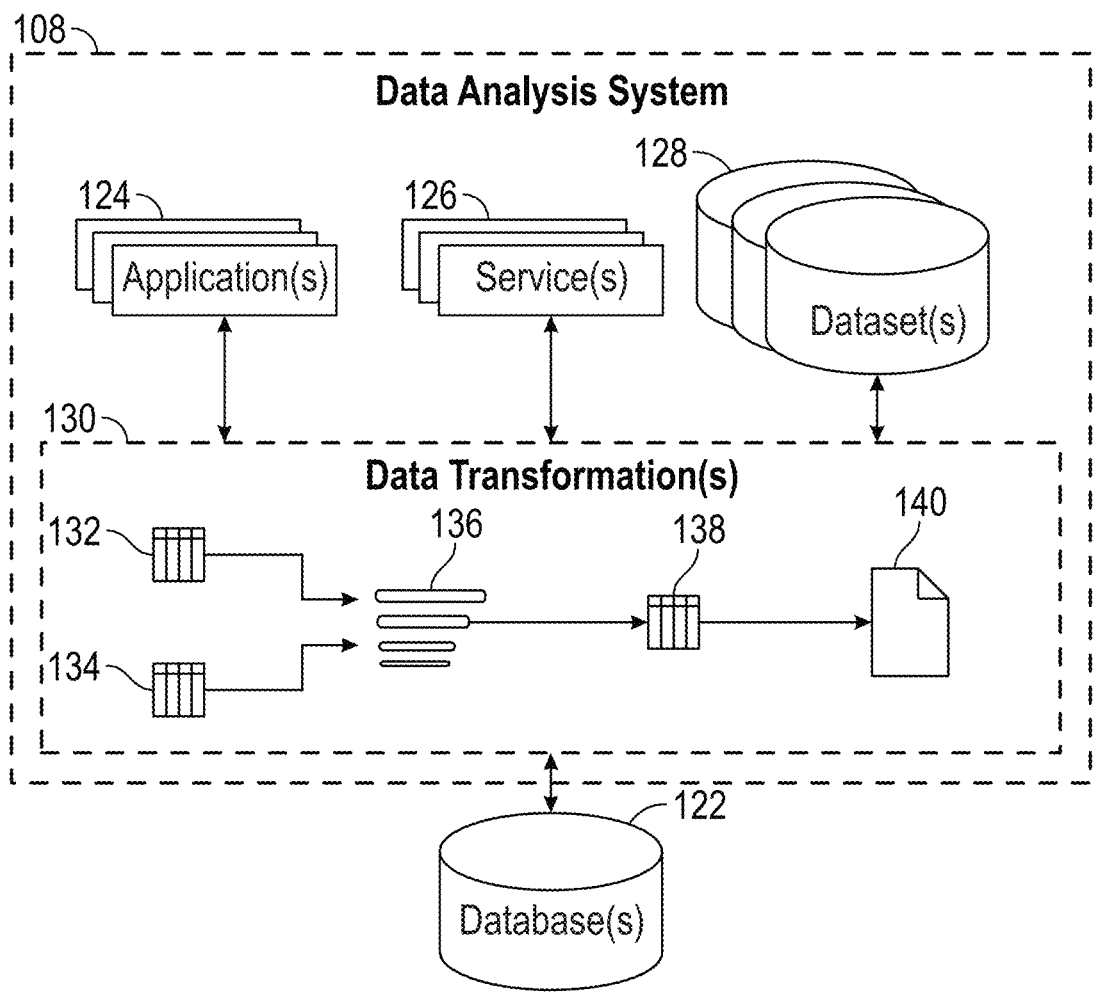
FIG. 1B illustrates a block diagram including an example implementation of a data analysis system, according to various implementations of the present disclosure.

FIG. 1B illustrates a block diagram including an example implementation of the data analysis system 108, according to various implementations of the present disclosure. In particular, the data analysis system 108 can be used in the example operating environment 100 described above with respect to FIG. 1A.

The example data analysis system 108 includes one or more applications 124, one or more services 126, one or more initial datasets 128, and one or more data transformation process(es)/pipline(s) 130. The example data analysis system 108 may also include one or more databases 122, which in various implementations may be internal, or external, to the data analysis system 108. In various implementations, database(s) 108 may store the datasets 128, modifications of the datasets 128, data processed by the data analysis system 108, and/or any other data or information as needed for providing the functionality of the data analysis system 108 as described herein.

The data analysis system 108 can receive data, e.g., the time-sensitive data 110 and the other data 112, transform, cleanse, standardize, and/or otherwise process the data, store the processed data, and optionally record the data processing/transformations. The one or more applications 124 can include applications that enable users to view datasets, interact with datasets, filter data sets, and/or configure dataset transformation processes. For example, the data analysis system 108 may provide various interactive graphical user interfaces for generating and updating schedules of items, as further described in detail herein. The one or more services 126 can include services that can trigger the data requests, data transformations, and/or processing, and/or API services for receiving and transmitting data. The one or more initial datasets 128 can be automatically retrieved from external sources (e.g., time-sensitive data 110 and other data 112) and/or can be manually imported by a user. The one or more initial datasets 128 can be in many different formats such as a tabular data format (SQL, delimited, or a spreadsheet data format), a data log format, time series data and/or the like.

The data analysis system 108, via the one or more services 126, can apply the data transformation processes 130, e.g., to combine data, clean data, modify data, and/or convert the formats of the data to a common format, or into formats that are useable by the data analysis system 108. An example data transformation process 130 is shown. The data analysis system 108 can receive one or more initial datasets 132, 134. The data analysis system 108 can apply a transformation to the dataset(s). For example, the data analysis system 108 can apply a first transformation 136 to the initial datasets 132, 134, which can include joining the initial datasets 132, 134 (such as or similar to a SQL JOIN), format converting the initial datasets 132, 134, and/or a filtering of the initial datasets 132, 134. The output of the first transformation 136 can include a modified dataset 138. A second transformation of the modified dataset 138 can result in an output dataset 140, such as a joined table in a tabular data format that can be stored in the database 122. Each of the steps in the example data transformation process 130 can be recorded by the data analysis system 108 and made available as a resource for further use in the data analysis system 108. For example, a resource can include a dataset and/or a dataset item, a transformation, or any other step in a data transformation process. As mentioned above, the data transformation processes 130 can be triggered by the data analysis system 108, where example triggers can include a periodic or intermittent schedule, detected events, manual triggers by a user, and/or the like.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data analysis system 108 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data analysis system 108 may enable other data transformation systems to perform transformations. For example, suppose the system stores two "raw" datasets R1 and R2 that are both updated periodically. Each update creates a new version of the dataset and corresponds to a different transaction. The datasets are deemed raw in the sense that transformation code may not be executed by the data analysis system 108 to produce the datasets. Further suppose there is a transformation A that computes a join between datasets R1 and R2. The join may be performed in a data transformation system such as SQL database system, for example. More generally, the techniques described herein are agnostic to the particular data transformation engine that is used. The data to be transformed and the transformation code to transform the data can be provided to the engine based on information stored in the catalog including where to store the output data.

According to some implementations, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service then determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

In general, data is received by the data analysis system 108, from the master data system 102, processed and/or transformed so as to be useable in the generating and/or updating of schedules, stored by the data analysis system 108 (e.g., in database(s) 122), and then used in the generation of interactive graphical user interfaces as described herein. Once an updated schedule is determined, data indicating the schedule updates is communicated back to the master data system 102.

Further details regarding the implementation of data analysis system 108 are described below in reference to FIG. 6.

In an implementation the data analysis system 108 (or one or more aspects of the data analysis system 108) may comprise, or be implemented in, a "virtual computing environment". As used herein, the term "virtual computing environment" should be construed broadly to include, for example, computer readable program instructions executed by one or more processors (e.g., as described below in the example of FIG. 6) to implement one or more aspects of the modules and/or functionality described herein. Further, in this implementation, one or more modules/engines/etc. (e.g., applications 124, services 126, and/or the like) of the data analysis system 108 may be understood as comprising one or more rules engines of the virtual computing environment that, in response to inputs received by the virtual computing environment, execute rules and/or other program instructions to modify operation of the virtual computing environment. For example, a request received from user device(s) 104 may be understood as modifying operation of the virtual computing environment to cause the system to gather data associated with the request, generate and/or update one or more interactive graphical user interfaces, and/or communication data back to the master data system 102. Such functionality may comprise a modification of the operation of the virtual computing environment in response to inputs and according to various rules. Other functionality implemented by the virtual computing environment (as described throughout this disclosure) may further comprise modifications of the operation of the virtual computing environment. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the data analysis system 108 as a virtual computing environment may advantageously enable executing different aspects or modules of the system on different computing devices or processors, which may increase the scalability of the system. Implementing one or more aspects of the data analysis system 108 as a virtual computing environment may further advantageously enable sandboxing various aspects, data, or modules of the system from one another, which may increase security of the system by preventing, e.g., malicious intrusion into the system from spreading. Implementing one or more aspects of the data analysis system 108 as a virtual computing environment may further advantageously enable parallel execution of various aspects or modules of the system, which may increase the scalability of the system. Implementing one or more aspects of the data analysis system 108 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Methods and Functionality of the Data Analysis System

FIGS. 1C-1F are flowcharts illustrating example methods and functionality of the data analysis system 108, according to various implementations of the present disclosure. In various implementations, and as described below, various blocks of the methods described below may be optional, and/or the blocks may occur in different orders.

Figure 1C:
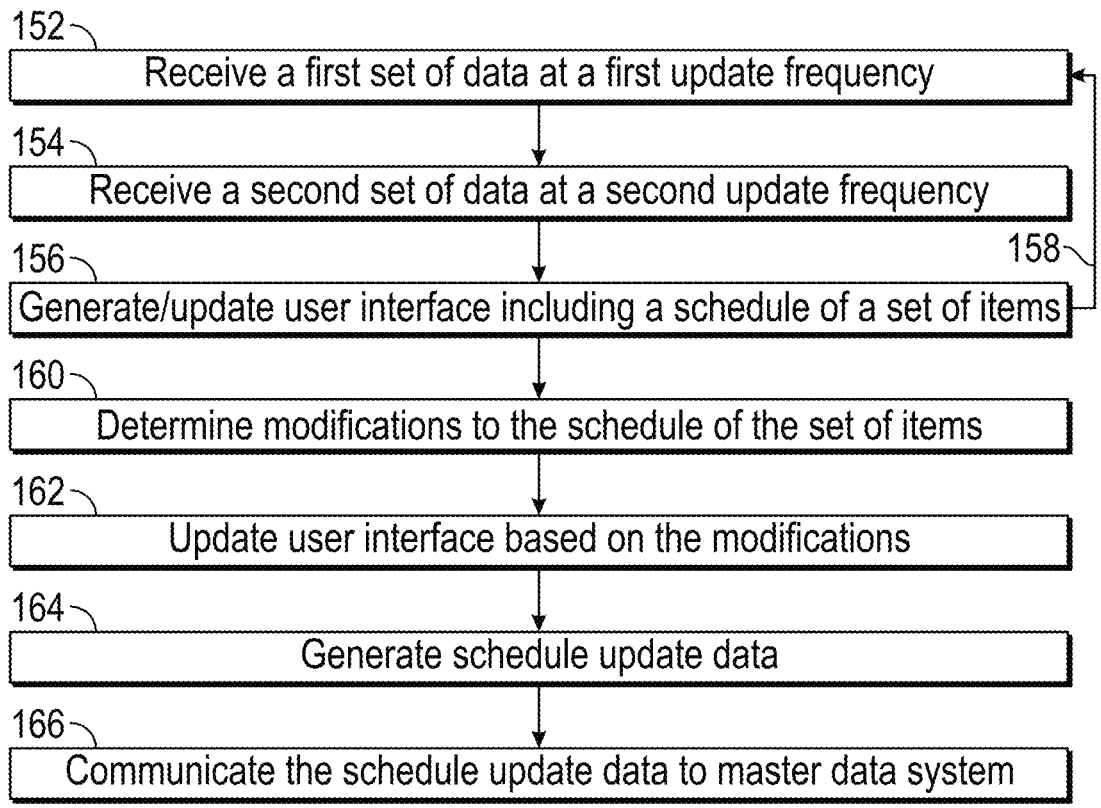
FIGS. 1C-1F are flowcharts illustrating example methods and functionality, according to various implementations of the present disclosure.

FIG. 1C is a flowchart illustrating an example method of the data analysis system 108 related to receipt of data, generation/updating of interactive graphical user interfaces, and communication of schedule update data to the master data system 102.

At block 152, the data analysis system 108 receives a first set of data from the master data system 102. The first set of data may include, as described above, time-sensitive data 110, which generally includes schedule data, but may include any other data that is important for creating or updating a schedule of items.

At block 154, the data analysis system 108 receives a second set of data from the master data system 102. The second set of data may include, as described above, other data 112, which generally includes any data that is not time-sensitive data, and may include, for example, various types of metric data. Accordingly, the time-sensitive data 110 may generally be more time-sensitive, relative to the other data 112, for scheduling purposes.

The first set of data (e.g., time-sensitive data 110) and the second set of data (e.g., other data 112) may be communicated to the data analysis system 108 periodically, intermittently, according to a schedule, on demand, as data is updated/changed, and/or according to any other suitable scheme or combination of the foregoing. As indicated in FIG. 1A, the time-sensitive data 110 and the other data 112 may be separately communicated to the data analysis system 108, and may be communicated with different update frequencies. In particular, the first set of data may be received by the data analysis system 108 at a first update frequency, while the second set of data may be received by the data analysis system 108 at a second update frequency. Separate communications and update frequencies may advantageously enable the data analysis system 108 to more efficiently receive, and/or to prioritize receipt of and/or processing of, information that is most time-sensitive for creating/updating a schedule. In some implementations, time-sensitive data 110 may be updated and/or communicated to the data analysis system 108 on the order of milliseconds, second, or minutes, while the other data 112 may be updated and/or communicated to the data analysis system 108 on the order of seconds, minutes, tens of minutes, or hours. Differing communications schedules may apply to different types of the other data 112.

At block 156, the data analysis system 108 may generate and/or update an interactive graphical user interface based on the received data. (As described here, the data analysis system 108 may generate data useable for rendering such an interactive graphical user interface, which interactive graphical user interface may then be rendered by user device(s) 104. However, for simplicity and clarity of explanation, the present disclosure describes the data analysis system 108 as generating/updating the interactive graphical user interface.) The interactive graphical user interface may include various aspects and functionality, each of which are described in detail below in reference to various figures. The interactive graphical user interface may include at least a schedule of a set of items.

As indicated by arrow 158, the interactive graphical user interface may be updated based on receipt of additional data by the data analysis system 108. In particular, the interactive graphical user interface may be automatically updated, even while the interactive graphical user interface is in use by a user, to reflect updated time-sensitive data, such as schedule data. For example, as described below, the interactive graphical user interface may include a plurality of timelines based on the schedule data, which timelines may automatically be updated based on receipt of schedule data from the master data system 102. Accordingly, a user of the data analysis system 108 may be always working with up-to-date information when determining schedule modifications. Similarly, the interactive graphical user interface may be updated automatically based on receipt of other data, such as metric data.

In various implementations, the data analysis system 108 may pull data from the master data system 102, and master data system 102 may push data to the data analysis system 108, and/or any combination of the forgoing (e.g., for different types of data, and/or data from different systems).

The interactive graphical user interface may include functionality for selecting a set (or a subset) of the items, selecting a relevant time frame for rescheduling evaluation of the set/subset of items, and selecting a primary metric evaluating rescheduling options. These aspects of the interactive graphical user interface are generally described in reference to FIGS. 1D and 2 below. The interactive graphical user interface may generally include three additional portions: a first portion with a plurality of timelines each associated with a different one of the set/subset of items, and with indications of instances of the primary metric located relative to the timelines (these aspects of the interactive graphical user interface are generally described in reference to FIGS. 1D and 3A-3C below); a second portion with calculated metric information associated with a selected part of a timeline or a selected indication of an instance of the primary metric (these aspects of the interactive graphical user interface are generally described in reference to FIGS. 1E and 4A-4C below); and a third portion with a log of scheduling changes, and a summary of the effects of the scheduling changes on various metrics (these aspects of the interactive graphical user interface are generally described in reference to FIGS. 1F and 5A-5B below). The interactive graphical user interface includes interactive functionality for suggesting rescheduling options in view of the effects of those changes on various metrics, evaluating various rescheduling options in view of effects on the various metrics, adjusting instances of metrics related to items/timelines in view of scheduling changes, and the like.

At block 160, the data analysis system 108 may determine modifications to the schedule of the set/subset of items. Such modifications may be determined, for example, in response to various user inputs. For example, a user may indicate selection of a schedule change option, as described below. In another example, the system may determine one or more possible schedule change options, as described below. In another example, a user may indicate a change to a metric associated with the schedule of the set/subset of items. Other examples are described below.

At block 162, the data analysis system 108 may update the interactive graphical user interface based on the determined modifications, e.g., to show the one or more possible change options, a change in the schedule of the set/subset of items based on selection of a schedule change option, a change in a metric or instance of a metric based on a user input, and/or the like.

At block 164, the data analysis system 108 may generate schedule update data, e.g., based on user inputs indicating changes to the schedule of the set/subset of items, changes to metrics, and/or the like. Such schedule update data may include, for example, a listing of changes to the schedule data, such as reassignment of items from one series of events or locations to another, or reassignment of metrics to items, and/or the like.

At block 166, the data analysis system 108 communicates the schedule update data to the master data system 102, where the updates may be implemented by the master data system 102. Such communication may be initiated by an input provided by a user (e.g., the user indicating an acceptance of proposed schedule changes). Accordingly, the data analysis system can enable efficient solutions to the complex problem of rescheduling of items, taking into account various metrics, and using data from potentially disparate data sources.

Figure 1D:
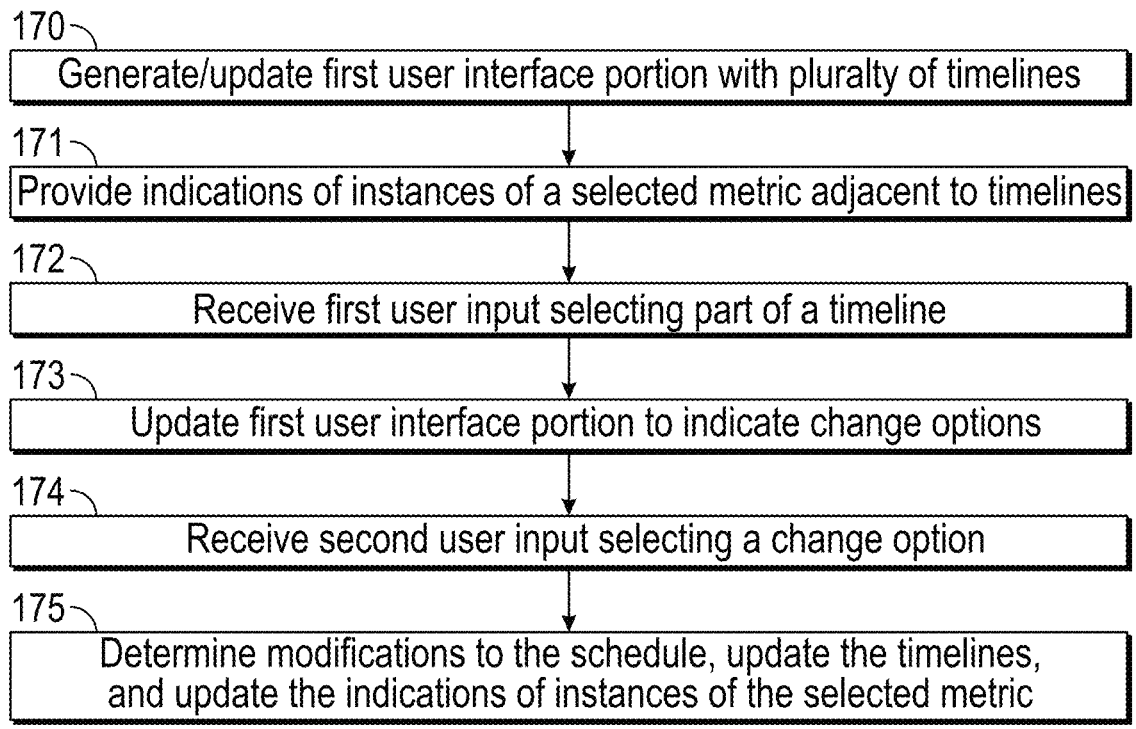

FIG. 1D is a flowchart illustrating an example method of the data analysis system 108 related to functionality of a first portion of the interactive graphical user interface (generally referred to herein as "the first user interface portion", the functionality of which is further generally described in reference to FIGS. 3A-3C below). In general, as further described below in reference to FIG. 2, a user may interact with the interactive graphical user interface to select a subset of items, select a relevant time frame for rescheduling evaluation of the subset of items, and select a primary metric evaluating rescheduling options.

At block 170, the data analysis system 108 generates/updates the first user interface portion to include at least a plurality of timelines. The timelines are generated based on a subset of the schedule data associated with each of the items of the subset of items. In general, each item of the subset of items is represented by a timeline in the first user interface portion, and each timelines includes sequential indications of events and locations associated with the respective items. Thus, for example, a timeline associated with an item may indicate a first location of the item for a period of time, followed by movement of the items from the first location to a second location for a second period of time, followed by the second location of the item for a third period of time, and so on.

At block 171, the data analysis system 108 further includes, in the first user interface portion, indications of instances of the selected/primary metric, where the indications of the metric are spatially located in the first user interface portion adjacent to related parts of the timelines. Thus, for example, when the selected metric comprises "maintenance events", various indications of scheduled or needed maintenance events associated with an item may be provided adjacent to the timeline for the item, in locations corresponding to times for the respective scheduled or needed maintenance events. Such indications may comprise icons, lines, dots, and/or the like. Such indications may further span a portion of the timeline so as to indicate, e.g., an expected time associated with the metric (e.g., a time to complete a maintenance event).

At block 172, the data analysis system 108 receives a first user input selecting a part of a timeline. For example, the user may select a part of a timeline representing a movement of an item during a period of time. In response, at block 173, the data analysis system 108 determines any possible schedule change options associated with the selected part of the timeline, and updates the first user interface portion to indicate the possible schedule change options. Such indications may be provided, for example, by highlighting, coloring, bolding, providing contrasting lighting or coloring, and/or the like.

For example, the data analysis system 108 may determine, for a particular selected movement of a first item during a first period of time, that a second item shown in the first user interface portion may be changed or swapped with the first item, thereby effectively changing or swapping the schedules assigned to the first and second items. Such a schedule change may be an option because, for example, the first and second items may be in a same location prior to the selected movement, and may thereby change or swap schedules at that location. Such schedule change options need not overlap in time. Rather, in the example of physical items, the schedule change options may only need to overlap in location prior to the selected movement (e.g., such that the two items are physically located in the same place so as to change or swap schedules).

At block 174, the data analysis system 108 may receive a second user input selecting one of the schedule change options. Such a user input may comprise a drag-and-drop of the selected part of the timeline to one of the (e.g., highlighted) schedule change options shown in the first user interface portion, or other suitable user interface interaction by the user indicating the selection.

At block 175, in response to the user selection of the change option, the data analysis system 108 may determine modifications to the schedules of the two affected items (e.g., to effectuate the schedule change), update the related timelines in the first user interface portion (and other related user interface portions), determine effects of the modifications to the schedules on the metrics, and update the indications of instances of the metrics in the first user interface portion (and other related user interface portions).

For example, the schedules of the two items subsequent to the selected parts of the timelines (e.g., the parts associated with the selected schedule change option) may be changed or swapped in the timelines. Further, such a change may have an effect on any instances of metrics associated with the items. For example, if a maintenance event is scheduled for an item at a particular location at a particular time, a schedule change may cause that item to not be at that particular location at that particular time. Such effects of the schedule change on metrics are automatically determined by the system, and indicated in the interactive graphical user interface. For example, in the example of a maintenance event (or other instance of an other selected metric) that is affect by a schedule change, the first user interface portion may be updated to visually indicate that the maintenance event no longer fits in the schedule (e.g., is no longer associated with a part of a timeline). Such an visual indication of a change may be provided by a change to the icons, lines, dots, and/or the like that represent the instances of the metrics. For example, in an implementation a line indication may change to a dot indication, while remaining adjacent to the timeline of the associated item.

As described below, the timelines in the first user interface portion may comprise groupings of timelines, where the timelines may be grouped, for example, based on "pinned" items (e.g., user-selected items to focus on), items resulting from search queries, all items of a subset or set of items, or the like. Such groupings may be sortable, filterable, modifiable, removable, etc.

Figure 1E:
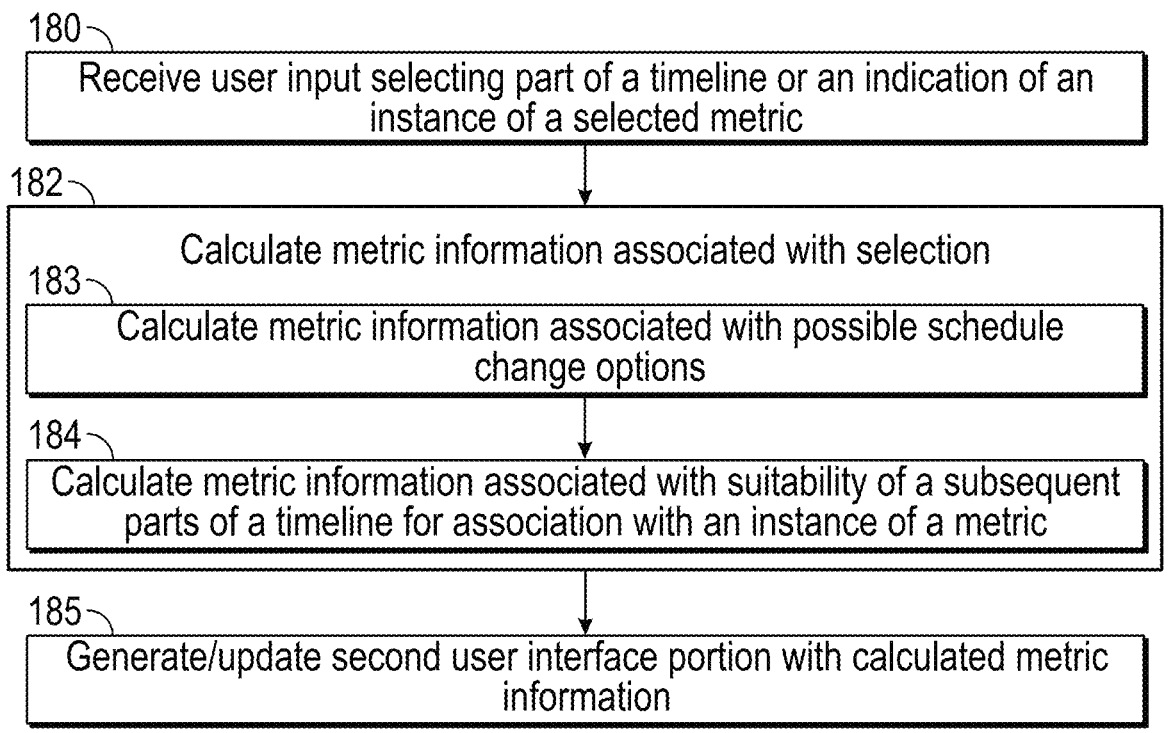

FIG. 1E is a flowchart illustrating an example method of the data analysis system 108 related to functionality of a second portion of the interactive graphical user interface (generally referred to herein as "the second user interface portion", the functionality of which is further generally described in reference to FIGS. 4A-4C below).

At block 180, the data analysis system 108 receives a user input, e.g., via the first user interface portion, selecting a part of a timeline (e.g., a location, a movement, etc.) or selecting an indication of an instance of a (e.g., selected/primary) metric. In response, the data analysis system 108, at block 182, determines information associated with the selected part of a timeline or selected indication of an instance of a metric, and at block 185, generates/updates the second user interface portion to display the determined information.

Accordingly, at block 182, the data analysis system 108 accesses, calculates and/or otherwise determines metric information associated with the selected part of a timeline or selected indication of an instance of a metric.

In the example of a selected movement (e.g., a part of a timeline) the determined metric information may include, e.g., revenue associated with the movement, delays associated with the movement, delay cost estimates associated with the movement, connections associated with the movement, and/or the like. As indicated by block 183, the second user interface portion may also include a listing of possible schedule change options associated with the movement (which may be determined by the data analysis system 108, as described above), and for each of the schedule change options, calculated metrics associated with each. In the example of a selected location (e.g., a part of a timeline), the determined metric information may include, e.g., maintenance events associated with the location, utilization information associated with the location, and/or the like.

Determined metric information associated with the possible schedule change options may be visualized in the interactive graphical user interface as one or more colored shapes or icons, overlaid on which may be numerical indicators. For example, each metric may be represented by one or more colored squares, where a first colored square is red to indicate an unresolvable negative impact on the metric, a second colored square is orange to indicate a resolvable negative impact on the metric, and a third colored square is green to indicate no impact on the metric. (Of course, in various implementations, other suitable colors or shapes may be used.) Further, numerical indicators may be overlaid on each square, providing a quantification of the impact on the metric. For example, in the example of the metrics being "maintenance events" and "connections" (e.g., passenger or cargo connections to subsequent movements), for a given schedule change option, the second user interface portion may indicate via the colored shapes, for each of the metrics, effects of the schedule change on the metrics (e.g., number of connections that will be unresolvable missed (e.g., due to delays); number of connections that may be missed, but can be resolved (e.g., but rescheduling cargo, passengers, etc.); and number of connection that will not be affected). In some implementations, all three squares/shapes may be displayed for each metric. In other implementations, only squares/shapes that show effects (e.g., that would have a numerical indicator other than 0) may be displayed for each metric. In various implementations, the squares/shapes/icon may or may not be colored. In an example, "unresolvable" negative impact means an impact on a metric that cannot be fixed/resolved/mitigated by making further schedule adjustments based on information currently available to the data analysis system 108 and/or based on information associated with currently displayed items (e.g., the selected subset of items), while "resolvable" negative impact means an impact on a metric that can be fixed/resolved/mitigated by making further schedule adjustments.

In the example of a selected indication of an instance of a metric, the determined metric information may include, e.g., a status of the metric, possible reassignment of the metric to other locations (e.g., in the instance of a metric, e.g., a maintenance event, that is not associated with a part of a timeline), and/or the like. As indicated by block 184, the second user interface portion may also include a listing or graph of subsequent parts of a timeline, and their respective suitabilities for association with the selected instance of the metric. The suitabilities may be determined by the data analysis system 108 based on (1) historical information regarding whether the subsequent parts of the timeline (e.g., locations) have performed the metric previously (e.g., performed a particular maintenance event), (2) whether the subsequent parts of the timeline (e.g., locations) provide enough time to perform the metric (e.g., a particular maintenance event, based on historical information on how long it takes to complete the maintenance event), (3) whether subsequent parts of the timeline (e.g., locations) have capacity to perform the metric (e.g., maintenance event, based on work capacity available), (4) whether subsequent parts of the timeline (e.g., locations) occur soon enough to satisfy a timeframe for completing the metric (e.g., day remaining until a maintenance event needs to be performed), (5) any combination of the foregoing, and/or the like.

In an implementation, the data analysis system 108 may provide a further interactive graphical user interface in which the user may access historical information associated with parts of timelines (e.g., locations, movements, etc.), metrics (e.g., maintenance events, and the locations where those maintenance events have historically been performed, etc.), and/or the like.

Figure 1F:
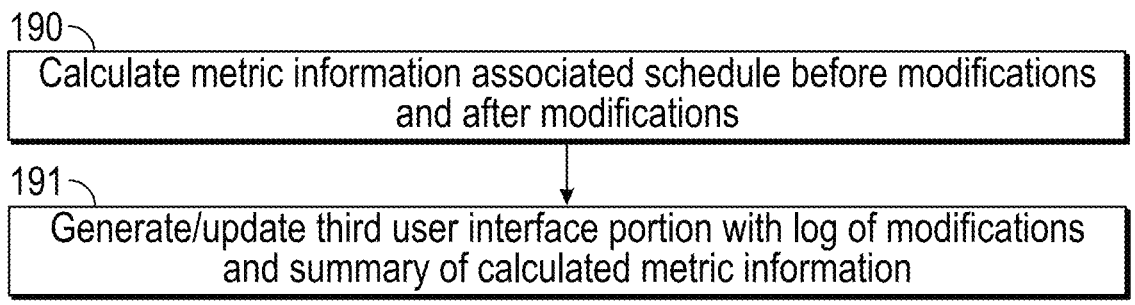

FIG. 1F is a flowchart illustrating an example method of the data analysis system 108 related to functionality of a third portion of the interactive graphical user interface (generally referred to herein as "the third user interface portion", the functionality of which is further generally described in reference to FIGS. 5A-5B below).

At block 190, the data analysis system 108 accesses, calculates, and/or otherwise determines metric information associated with the schedule of the set or subset of items both before and after any modifications to the schedule (e.g., as selected by the user). The metric information may be determined across multiple metrics, and may include determined and displayed information as generally described above in reference to FIG. 1E.

At block 191, the data analysis system 108 generates/updates the third user interface portion to display the determined metric information. The third user interface portion may further include a log of modifications to the schedule. The determined metric information may be provided in a summary form, including a table showing, for each item, the effect on each metric of the schedule modifications. The third user interface portion may provide functionality to drill down on any particular metric to view more detail information of the effect for the schedule modifications.

VI. Example Interactive Graphical User Interfaces

Figure 2:
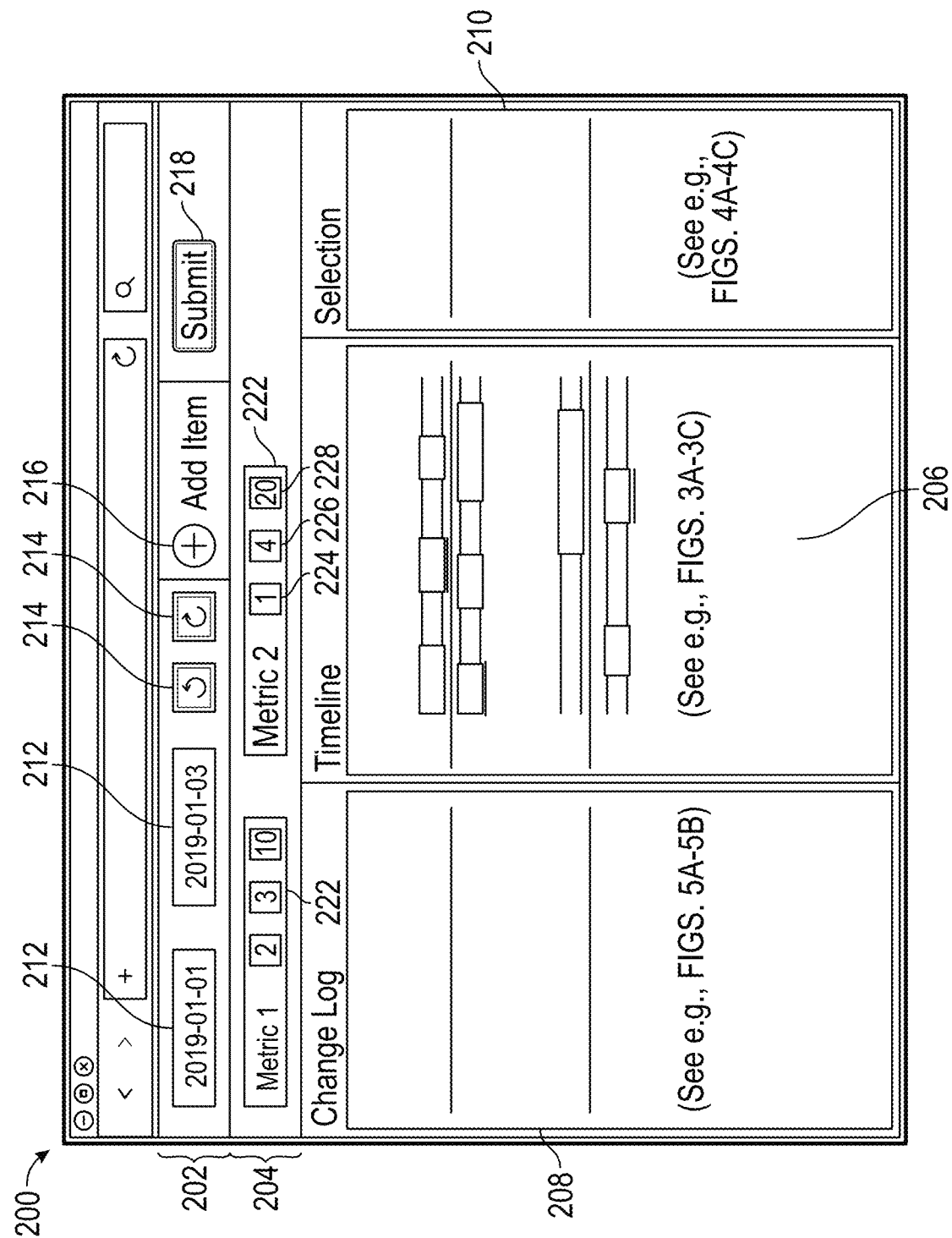
FIG. 2 illustrates an example interactive graphical user interface, according to various implementations of the present disclosure.

FIG. 2 illustrates an example interactive graphical user interface 200, according to various implementations of the present disclosure. As described herein, the example interactive graphical user interface 200 may be provided via data from the data analysis system 108 that is rendered by a browser of user device(s) 104. Various functionality related to the example interactive graphical user interface 200 is also described above in reference to FIGS. 1C-1F.

The example interactive graphical user interface 200 may include a first selection bar 202, a second selection bar 204, a first user interface portion 206 (corresponding to the "first user interface portion" generally described above), a second user interface portion 210 (corresponding to the "second user interface portion" generally described above), and a third user interface portion 208 (corresponding to the "third user interface portion" generally described above).

Via the first selection bar 202, the user may: via selection boxes 212, select a time period of interest for schedule review (which may include selection of times and dates, in an implementation); via user interface elements 214, undo and redo any modifications to the schedule that are made, via user interface element 216, add items to the interactive graphical user interface (e.g., select a subset of items for display in the plurality of timelines); and via user interface element 218, provide a user input to cause communication of the schedule update data (e.g., including the modification to the schedule) to the master data system 102.

The second selection bar 204 includes one or more user interface elements 222, each representing a different selectable metric. Via selection of one or more of the one or more user interface elements 222, the user may indicate one or more selected/primary metric(s) for causing display of corresponding indications of instances of the selected metric(s), e.g., in the first user interface portion adjacent to the timelines. Additionally, next to each of the metric names in the second selection bar 204, the interactive graphical user interface includes indications of metric information 224, 226, and 228. The indications of metric information may include a current status of the metric as related to the selected subset of items. The current status of the metrics may be indicated by one or more colored shapes or icons 224, 226, and 228, which may include numerical overlays, as described above in reference to FIG. 1E. Examples of metrics include, connections, maintenance events, and/or the like. For example, in reference to example interactive graphical user interface 200, if metric 2 represents "connections", shape 224 may be colored red and indicate 1 unsolvable missed connection, shape 226 may be colored orange and indicate 4 possibly resolvable missed connections, and shape 228 may be colored green and indicate 20 unaffected connections. As mentioned above, in various implementations, certain of the colored shapes or icons may not be displayed if the numerical indicator would otherwise be 0.

Details and functionality related to the first user interface portion (e.g., a timeline user interface portion) are generally further described below in reference to FIGS. 3A-3C. Details and functionality related to the second user interface portion (e.g., a selection user interface portion) are generally further described below in reference to FIGS. 4A-4C. Details and functionality related to the third user interface portion (e.g., a change log user interface portion) are generally further described below in reference to FIGS. 5A-5B.

In various alternative implementations, the various portions of the example interactive graphical user interface 200 may be arranged differently. Further in some implementations various portions of the user interface may not be included, and/or different combinations of the user interface may be provided. For example, some implementations may omit the second selection bar 204. In another example, some implementations may omit one or more of the second selection bar 204, the second user interface portion 210, and/or the third user interface portion 208. In yet another example, functionality associated with various combinations of the user interface portions of example interactive graphical user interface 200 may be combined.

Figure 3A:
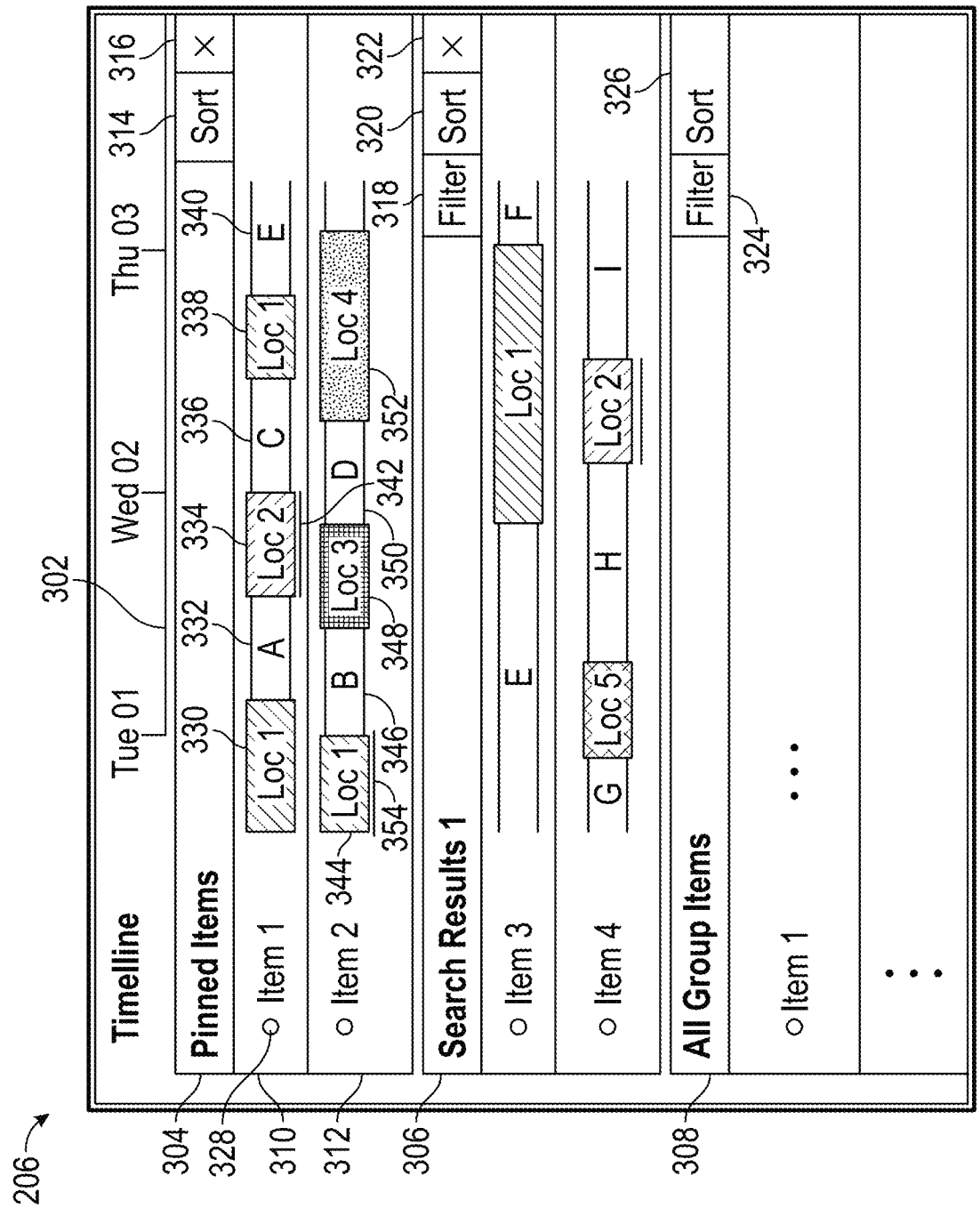
Figure 3B:
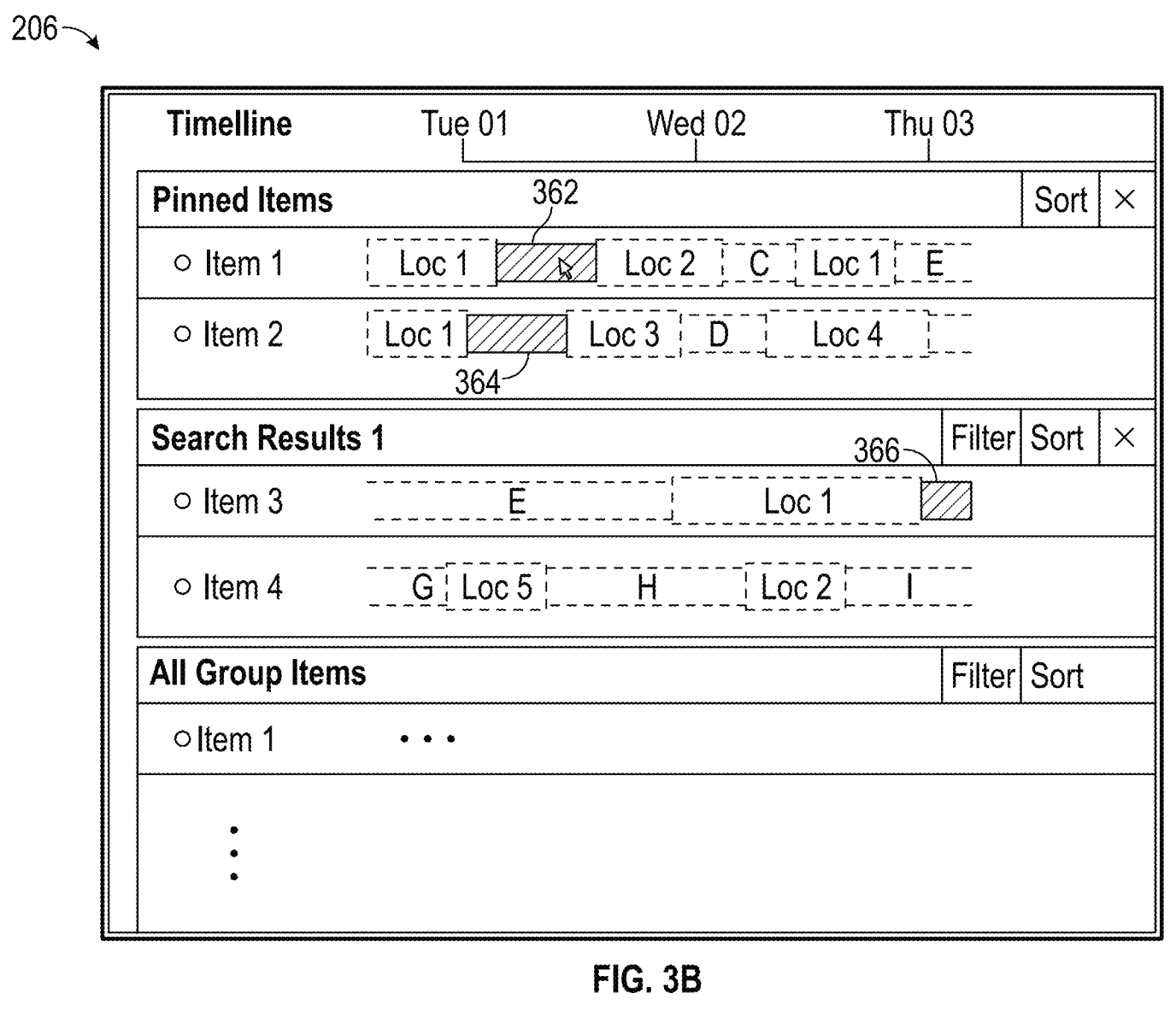
Figure 3C:
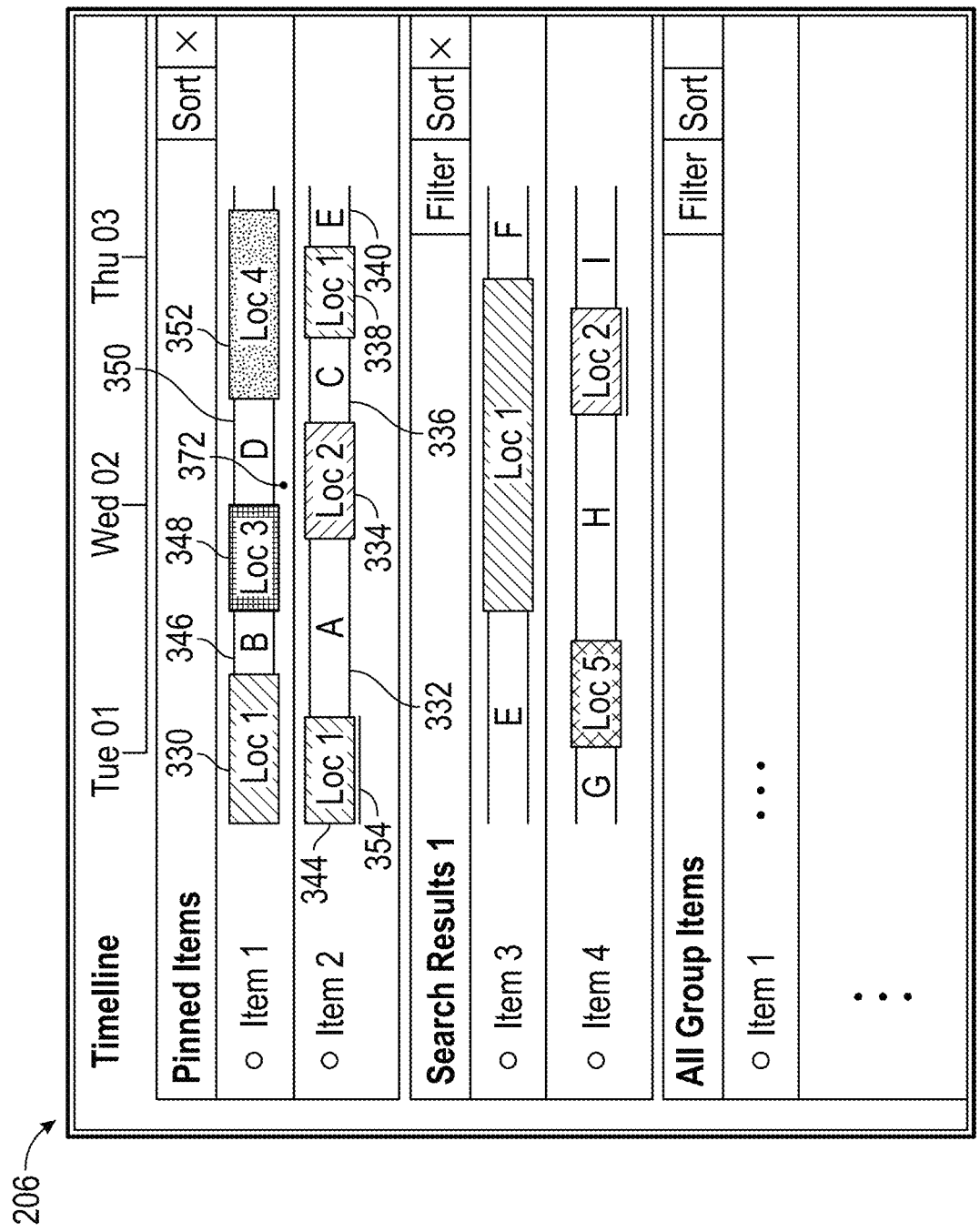

FIGS. 3A-3C illustrate example interactive graphical user interfaces corresponding to first user interface portion 206, according to various implementations of the present disclosure.

Referring to FIG. 3A, the first user interface portion 206 includes a timeline 302 that may correspond to a selected time period selected by the user, and indicates a time period associated with other item-specific timelines in the user interface. The first user interface portion 206 further includes one or more groupings of a selected set or subset of items, where the groupings are separately indicated in the interactive graphical user interface. In the example first user interface portion 206, the groupings includes pinned items 304, search results 1 items 306, and all group items 308. As described above, each of the groupings of items may be sorted, filtered, modified, removed, and/or the like, e.g., via user interface elements 314, 316, 318, 320, 322, 324, and 326, corresponding to each grouping of items. Further, when necessary, a user may scroll in the interactive graphical user interface via additional listed items/timelines that may not be displayed simultaneously on the display.

Each item in the first user interface portion 206 is separately indicated, e.g., items 310 ("Item 1") and 312 ("Item 2"), and some items may be repeated if the items appear in multiple groupings (e.g., Item 1 appearing in "Pinned Items" and in "All Group Items"). The items may be easily dragged-and-dropped, e.g., via user interface element 328) to rearrange the ordering of the items with the groupings, or to move items into or out of various groupings.

Each item in the first user interface portion 206 includes a corresponding timeline, which are generated based on the schedule data. For example, in the example first user interface portion 206 shown in FIG. 3A, "Item 1" includes a timeline with timeline parts 330, 332, 334, 336, 338, and 340. In the example, timeline parts 330, 334, and 338 correspond to locations, while timeline parts 332, 336, and 340 correspond to movements. As a further example, in the example first user interface portion 206 shown in FIG. 3A, "Item 2" includes a timeline with timeline parts 344, 346, 348, 350, and 352. In the example, timeline parts 344, 348, and 352 correspond to locations, while timeline parts 346, and 350 correspond to movements In general, different type of timeline parts may be differently colored or shaded to provide a visual indication to the user. Further, across various timelines, related timeline parts (e.g., the same locations) may be similarly colored or shaded to provide a visual indication to the user. Accordingly, timeline parts 330 and 344 may be similarly colored or shaded, and so forth.

The first user interface portion 206 further includes indications of instances of a selected/primary metric that may be overlaid or otherwise displayed in interactive graphical user interface. In the example first user interface portion 206 shown in FIG. 3A, indications of instances of a selected metric are shown for Item 1 at indication 342, and for Item 2 at indication 354. In the example first user interface portion 206 shown in FIG. 3A, indications 342 and 354 are visually presented as lines, indicating that they are associated with parts of the respective timelines. Further, they are located adjacent to the respective timelines and parts of the timelines, as described above.

As generally described herein, the user may select part of the timelines, indications of instance of metrics, etc., and generally interact with the first user interface portion 206 to determine rescheduling of the items and the effects on metrics.

Referring to FIG. 3B, the first user interface portion 206 is updated from that shown in FIG. 3A in response to a user selection of a timeline part 362 (corresponding to timeline part 332 shown in FIG. 3A). Accordingly, as described above in reference to FIG. 1D, the data analysis system 108 determines schedule change options, and highlight those determined schedule change options. Thus, in the example of FIG. 3B, timeline parts 364 and 366 are highlighted, as these provide options for schedule changes in view of the highlighted movements being preceded by the same location (e.g., "LOC 1").

Referring to FIG. 3C, the first user interface portion 206 is updated from that shown in FIGS. 3A and 3B in response to a user input indicating a schedule change between example timeline parts 332 and 346 (e.g., movement 332 of Item 1 is changed or swapped to Item 2, and movement 346 is changed or swapped to Item 1, and vice versa). As a result of the schedule change, the example first user interface portion 206 is further updated to indicate effects on instances of metrics. In particular, in the example of FIG. 3C, while indication 354 is unchanged as a results of the schedule change, the instance corresponding to indication 342 (of FIG. 3A) is affected, and so the indication is changed to a dot visualization 372 (in FIG. 3C). Thus, dot visualization 372 indicates to the user that an instance of a metric associated with Item 1, which was previously scheduled for the indicated point in time or a part of the timeline, is no longer associated with the timeline. For example, a maintenance event that we previously schedule to take place at LOC2 is no longer possible because, due to the schedule change/swap/modification, Item 1 will not be in LOC2 at the schedule time.

Figure 4A:
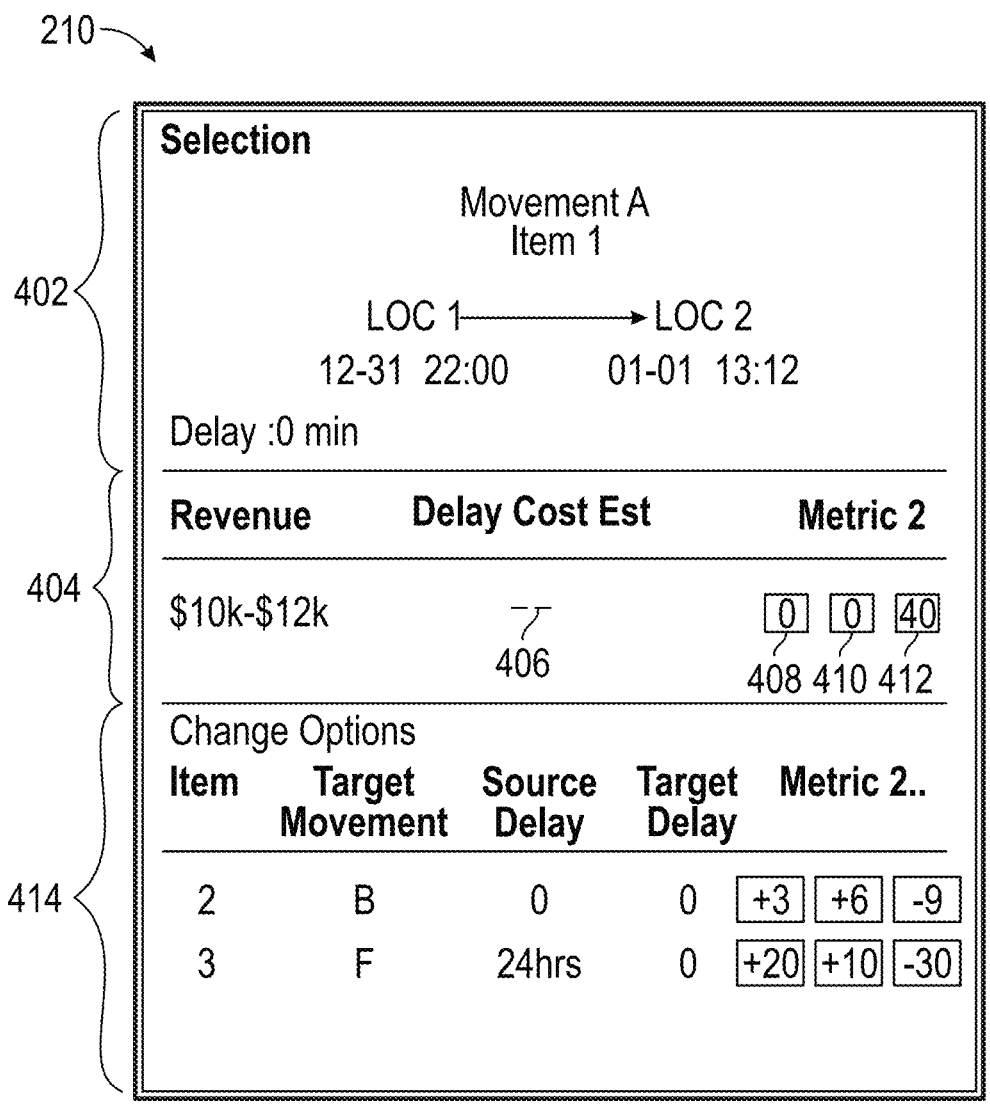
FIGS. 4A-4C illustrate example interactive graphical user interfaces, according to various implementations of the present disclosure.
Figure 4B:
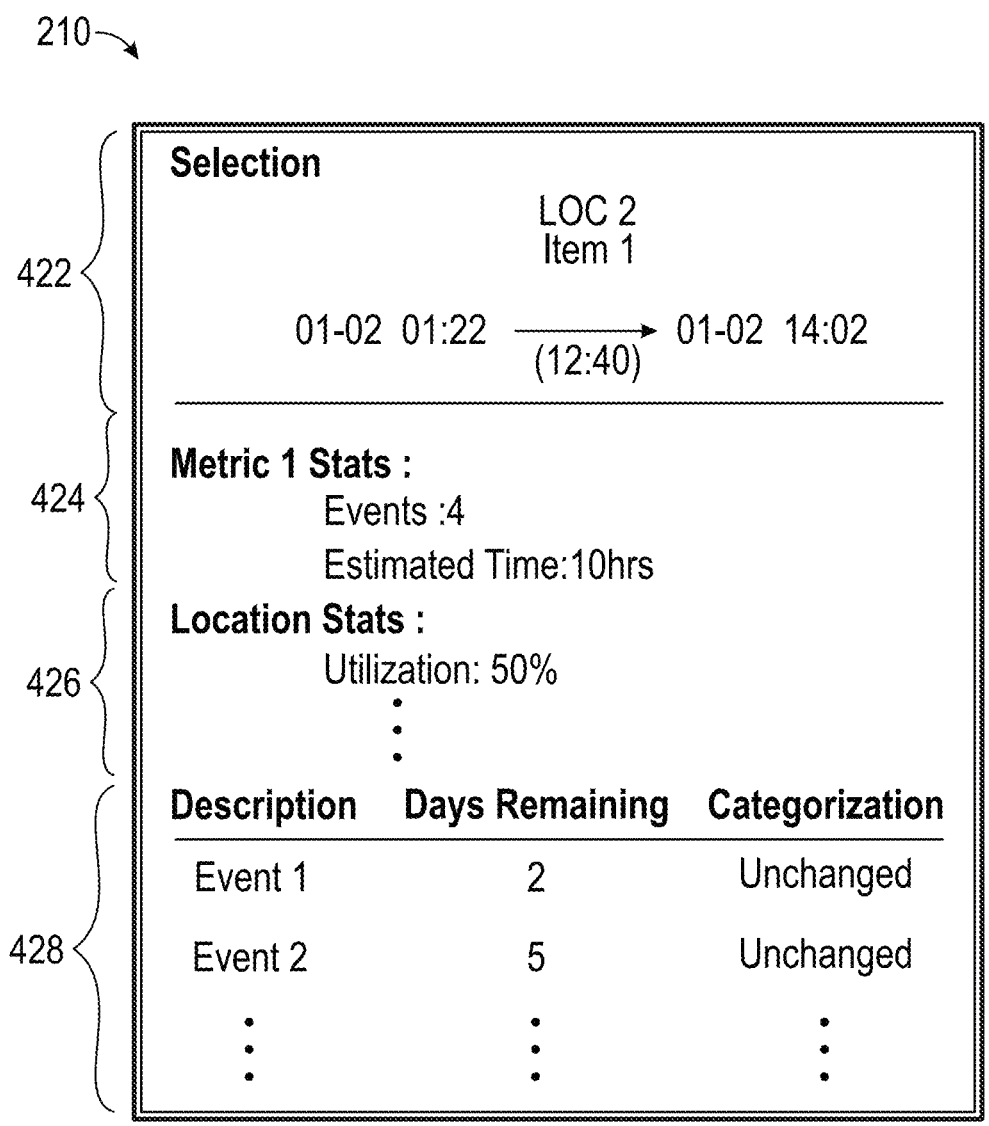
Figure 4C:
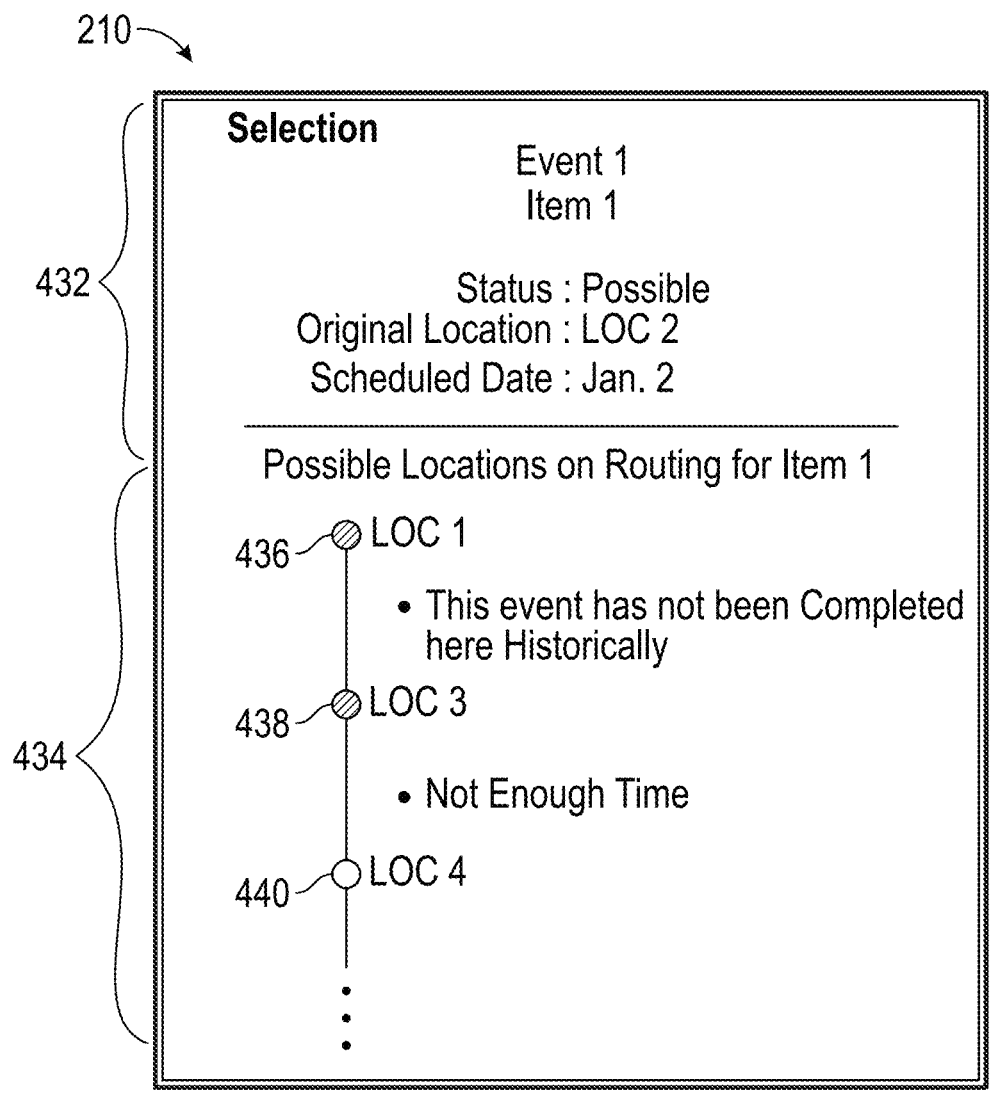

FIGS. 4A-4C illustrate example interactive graphical user interfaces corresponding to second user interface portion 210, according to various implementations of the present disclosure. As described above, in general, the second user interface portion 210 displays metric information associated with a selected part of a timeline or selected indication of an instance of a metric.

Referring to FIG. 4A, an example of the second user interface portion 210 is shown corresponding to selection of a "movement" part of a timeline (e.g., movement 332 of FIG. 3A). Accordingly, metric information associated with movement 332 is shown, including general information 402 (e.g., name, associated item, start location, start day/time, destination location, end/destination day/time, duration, delay, etc.), revenue information 404 (e.g., revenue associated with the movement, estimates costs 406 as a result of any delays, and related metric information 408, 410, 412), and schedule change options 414 (including, for each schedule change option, e.g., associated metric information of one or more metrics, etc.). For example, the schedule change options of the example shown in FIG. 4A indicate that changing or swapping with Item 2 may have a negative impact on Metric 2 in that it will increase the unresolvable issues by 3, it will increase the resolvable issues by 6, and decrease the non-issues (with Metric 2) by 9. As another example, the schedule change options of the example shown in FIG. 4A indicate that changing or swapping with Item 3 may create a delay of 24 hours, and have an even greater negative impact on Metric 2. As shown, metric information may be provided by one or more colored shapes or icons, which may include numerical overlays, as described elsewhere herein (including all alterative implementations). Via the second user interface portion 210, the user may optionally select one of the listed schedule change options to cause the corresponding schedule change to be made (e.g., in the first user interface portion 206).

Referring to FIG. 4B, an example of the second user interface portion 210 is shown corresponding to selection of a "location" part of a timeline (e.g., location 334 of FIG. 3A). Accordingly, metric information associated with location 334 is shown, including general information 422 (e.g., name, associated item, start day/time, end day/time, duration, delay, etc.), metric information 424 for one or more metrics (e.g., in the example of FIG. 4B, metrics associated with related maintenance events are shown), information 426 associated with the location (e.g., utilization of the location for certain maintenance events or other metrics), and a listing 428 of events (e.g., maintenance events) associated with Item 1 that are expected/scheduled to take place at LOC2. As shown, in listing 428 all events indicate a "days remaining" until the event is needed to take place, and a "categorization". The "categorization" indicates a status of the scheduled event, and may change as a result of a schedule change/swap/modification. For example, "unchanged" (or other appropriate indication) may indicate that no schedule changes have affected the scheduled event, "possible" or "needs review" (or other appropriate indication) may indicate that one or more schedule changes have affected the scheduled event and that the user need to review the event and associate it with a part of the timeline again, if possible, or reschedule the event.

Referring to FIG. 4C, an example of the second user interface portion 210 is shown corresponding to selection of an indication of an instance of a metric (e.g., indication 372 from FIG. 3C). Accordingly, metric information associated with indication 372 (in this example, a maintenance event) is shown, including general information 432 (e.g., name, associated item, status, original location, and scheduled date, etc.), and possible re-assignments of the metric to other locations 434. As the selected instance, in the example of FIG. 4C, is no longer associated with a part of a timeline as a result of a schedule change, the status of the instance of the metric has been changed from "scheduled" or "unchanged" (or other appropriate indicator) to "possible". As described above, "possible" indicates that there is a rescheduling of the instance/event that is possible based on the determination of possible re-assignments of the metric to other locations. "Needs review" may indicate that there is no rescheduling of the instance/event that is possible based on the determination of possible re-assignments of the metric to other locations.

In the possible re-assignments of the metric to other locations 434 portion of second user interface portion 210, the second user interface portion includes a listing or graph of subsequent parts of a timeline, and their respective suitabilities for association with the selected instance of the metric. The suitabilities may be determined by the data analysis system 108 based on various factors as described above in references to FIG. 1E. Icons 436 and 438 may be colored (e.g., red) or otherwise highlighted to indicate the corresponding locations are unsuitable for the event/instance of the metric, while icon 440 may be differently colored (e.g., yellow/orange) or otherwise highlighted to indicate the corresponding location is suitable for the event/instance of the metric.

Via the second user interface portion 210, the user may reschedule the event/instance of the metric for a different location.

In an implementation, selection of the metric name in the second user interface portion 210 (e.g., "Event 1") may take the user to a further interactive graphical user interface in which the user may access historical information associated with the metric (e.g., maintenance events, and the locations where those maintenance events have historically been performed, etc.), and/or the like.

FIGS. 5A-5B illustrate example interactive graphical user interfaces corresponding to third user interface portion 208, according to various implementations of the present disclosure.

Referring to FIG. 5A, the third user interface portion 208 may include a listing or log 502 of modifications to the schedule (e.g., determined as a result of user inputs selecting schedule change options), and a summary of determined metric information associated with the modifications to the schedule. In particular, the summary of determined metric information may include a table 508 showing, for each item, the effect on each metric of the schedule modifications. The table 508 may be modifiable via user interface elements 504 to summarize based on different groupings of items. The table 508 may also may be modifiable via user interface elements 506 to view a summary of metric information (as shown in the example third user interface portion 208 of FIG. 5A) or drill down on any particular metric to view more detail information of the effect for the schedule modification (as shown in the example third user interface portion 208 of FIG. 5B).

As shown in the example third user interface portion 208 of FIG. 5A, the table 508 indicates, for each combination of item and metric, a summary of calculated metric information in the form of one or more colored shapes or icons, which may include numerical overlays, as described elsewhere herein (including all alterative implementations). In particular, for each combination of item and metric, if the metric is affected by the schedule modifications, the summary in the table 508 may show the one or more colored shapes/icon before the modification, followed by an arrow, and then followed by the one or more colored shapes/icon after the modification. If there is no change to the metric as a results of the schedule modifications, only a single set of the one or more colored shapes/icon may be shown.

Referring to FIG. 5B, the user, via user interface elements 510, has selected to drill down on Metric 1 (in this example, maintenance tasks or events). Accordingly, at indicator 510 the metric summary is shown, and at table 512 details related to the metric are shown. In particular, affected maintenance tasks are listed, including related information (as generally previously described in reference to a similar user interface of FIG. 4B).

VII. Additional Implementation Details

In some implementations, an alert and/or notification is automatically transmitted by the data analysis system 108 in response to a schedule modification, a changing of a particular metric, or a metric by a particular amount, and/or the like. The alert and/or notification can be transmitted at the time that the alert and/or notification is generated or at some determined time after generation of the alert and/or notification. When received by a user device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Various implementations of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
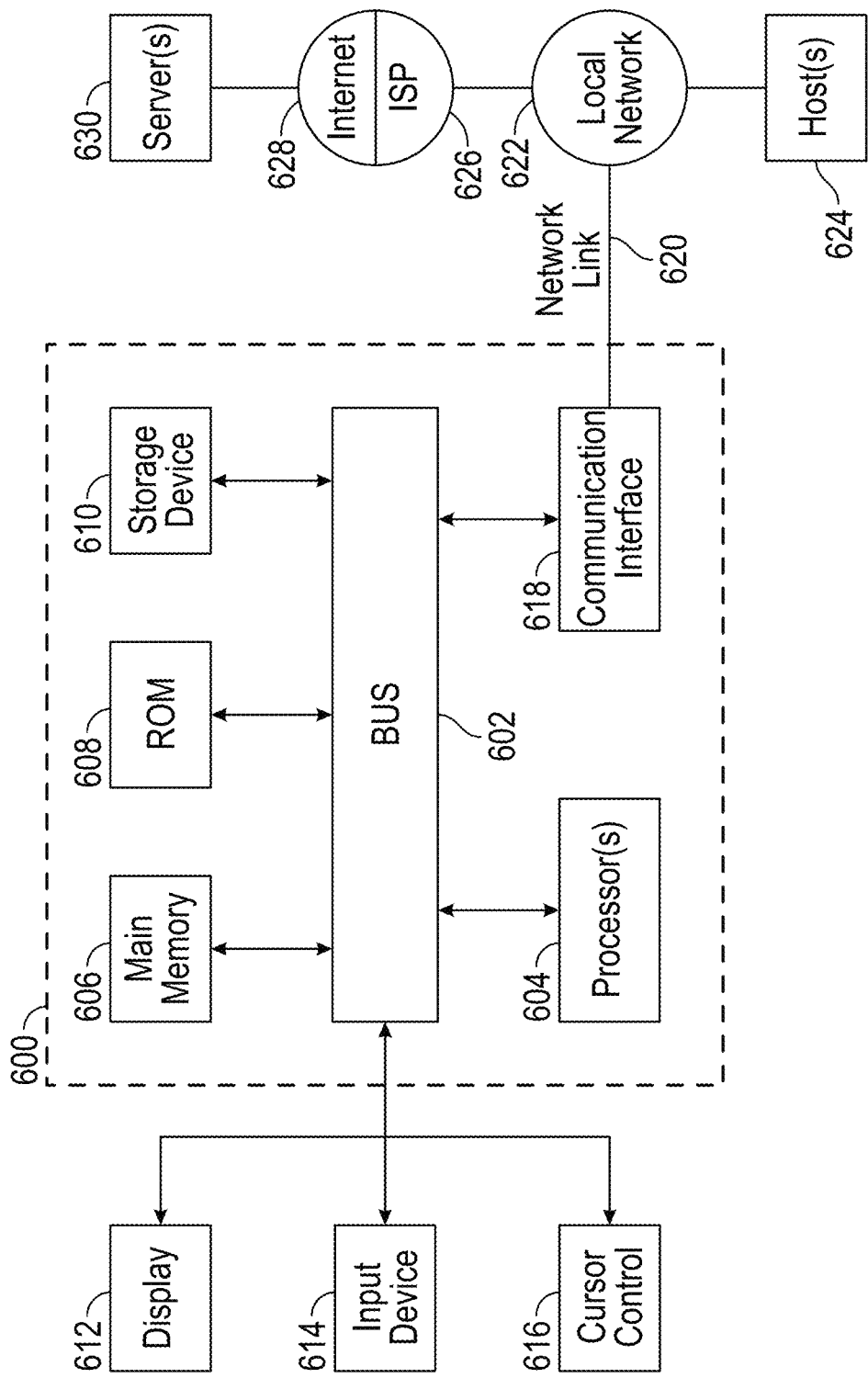
FIG. 6 illustrates a computer system by which certain aspects of the present disclosure may be implemented.

For example, FIG. 6 is a block diagram that illustrates a computer system 600 upon which various implementations may be implemented (e.g., data analysis system 108 may be implemented in computer system 600). Computer system 600 includes a bus 602 or other communication mechanism for communicating information, and a hardware processor, or multiple processors 604, coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one implementation, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative implementations, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
   by one or more processors executing program instructions:
   receiving schedule data and metric data, wherein the schedule data indicates at least a schedule of a set of items, and wherein the metric data indicates at least events related to the set of items;
   generating user interface data useable for rendering an interactive graphical user interface, the interactive graphical user interface including at least:
   a first user interface portion including at least a plurality of timelines indicating at least a portion of the schedule and based at least in part on a subset of the schedule data associated with a subset of the set of items; and
   one or more indications of instances of a metric from the metric data, wherein the one or more indications are spatially located adjacent to timelines of items to which the respective instances of the metric may relate, and wherein the one or more indications are configured to provide a visual representation of whether or not the respective instances of the metric are associated with parts of timelines of items; and
   in response to receiving one or more modifications to the schedule of the set of items via one or more of the timelines of the items, updating and causing display of the interactive graphical user interface indicating an update to the visual representation.

2. The computer-implemented method of claim 1 further comprising:
   by the one or more processors executing program instructions:
   periodically or intermittently receiving updates to the schedule data;
   periodically or intermittently receiving updates to the metric data; and
   updating the interactive graphical user interface in response to receiving at least the updates to the schedule data.

3. The computer-implemented method of claim 2, wherein the updates to the schedule data are received more frequently than the updates to the metric data, due at least in part to a time-sensitivity of the schedule data relative to the metric data.

4. The computer-implemented method of claim 1 further comprising:
   by the one or more processors executing program instructions:
   receiving a first user input, via the first user interface portion, selecting a first part of a first timeline of a first item;
   determining possible schedule change options from others of the plurality of timelines of the subset of the items;
   indicating or highlighting, in the first user interface portion, parts of the plurality of timelines to indicate the determined possible schedule change options, if any; and
   in response to a second user input indicating a selection of a schedule change option associated with a second part of a second timeline of a second item:
   determining modifications to the schedules associated with the first item and the second item to effectuate the selected schedule change; and updating at least the first user interface portion to indicate changes to the schedules associated with the first item and the second item in view of the selected schedule change.

5. The computer-implemented method of claim 4 further comprising:
by the one or more processors executing program instructions:
generating schedule update data and/or communicating schedule update data to a source data system in response to a third user input.

6. The computer-implemented method of claim 5 further comprising:
by the one or more processors executing program instructions:
in response to determining modifications to schedules in response to selection of a schedule change option:
determining updates to the one or more indications of instances of the metric; and
updating at least the first user interface portion to indicate the updates to the updates to the one or more indications.

7. The computer-implemented method of claim 1, wherein timeline comprises groupings of the subset of items based on at least one of: user indication of items to pin, results of a search query, a list of all items of a group of related items.

8. The computer-implemented method of claim 7, wherein the groupings are separately sortable and/or filterable.

9. The computer-implemented method of claim 1, wherein the interactive graphical user interface further includes at least:
a second user interface portion including at least calculated metric information associated with a selected part of the timeline or a selected indication of an instance of a selected metric.

10. The computer-implemented method of claim 9, wherein the calculated metric information is associated with a selected part of the timeline comprising a selected movement of an item, and wherein the computer-implemented method further comprises:
by the one or more processors executing program instructions:
determining, for the selected movement, one or more possible schedule change options from others of the plurality of timelines of the subset of the items;
calculating updated metric information associated with each of the one or more possible change options; and
including in the second user interface portion a listing of the possible schedule change options and the associated updated metric information associated with each.

11. The computer-implemented method of claim 10, wherein the updated metric information is provided at least in part as one or more colored shapes with overlaid numerical indicators indicating effects of the one or more possible schedule change options on various metrics.

12. The computer-implemented method of claim 9, wherein the calculated metric information is associated with a first selected indication of an instance of a selected metric, wherein the first selected indication of the instance of the selected metric is associated with a point in time and a third item, but not associated with a part of a timeline of the third item, and wherein the computer-implemented method further comprises:

by the one or more processors executing program instructions:
determining, for each of a plurality of subsequent parts of the timeline of the third item, a suitability of the subsequent part of the timeline for association with first selected indication of the instance of the selected metric; and
including in the second user interface portion a listing or graph of the plurality of subsequent parts of the timeline of the third item and the associated determined suitabilities associated with each.

13. The computer-implemented method of claim 9, wherein the interactive graphical user interface further includes at least:
a third user interface portion including at least a log of modifications to the schedule of the set of items.

14. The computer-implemented method of claim 13, wherein the third user interface portion further includes at least a summary of calculated metric information including a comparison of the calculated metric information before the modifications to the schedule and after the modifications to the schedule.

15. The computer-implemented method of claim 14, wherein the comparison of the calculated metric information is provided at least in part as one or more colored shapes with overlaid numerical indicators indicating effects of the modification to the schedule on various metrics.

16. A system comprising:
a computer readable storage medium having program instructions embodied therewith; and
one or more processors configured to execute the program instructions to cause the system to:
receive schedule data and metric data, wherein the schedule data indicates at least a schedule of a set of items, and wherein the metric data indicates at least events related to the set of items;
generate user interface data useable for rendering an interactive graphical user interface, the interactive graphical user interface including at least:
a first user interface portion including at least a plurality of timelines indicating at least a portion of the schedule and based at least in part on a subset of the schedule data associated with a subset of the set of items; and
one or more indications of instances of a metric from the metric data, wherein the one or more indications are spatially located adjacent to timelines of items to which the respective instances of the metric may relate, and wherein the one or more indications are configured to provide a visual representation of whether or not the respective instances of the metric are associated with parts of timelines of items; and
in response to receiving one or more modifications to the schedule of the set of items via one or more of the timelines of the items, update and cause display of the interactive graphical user interface indicating an update to the visual representation.

17. The system of claim 16, wherein the one or more processors are configured to execute the program instructions to further cause the system to:
receive a first user input, via the first user interface portion, selecting a first part of a first timeline of a first item;
determine possible schedule change options from others of the plurality of timelines of the subset of the items;

indicate or highlighting, in the first user interface portion, parts of the plurality of timelines to indicate the determined possible schedule change options, if any; and in response to a second user input indicating a selection of a schedule change option associated with a second part of a second timeline of a second item:
  determine modifications to the schedules associated with the first item and the second item to effectuate the selected schedule change; and
  update at least the first user interface portion to indicate changes to the schedules associated with the first item and the second item in view of the selected schedule change.

18. The system of claim 17, wherein the one or more processors are configured to execute the program instructions to further cause the system to:
  generate schedule update data and/or communicating schedule update data to a source data system in response to a third user input.

19. The system of claim 18, wherein the one or more processors are configured to execute the program instructions to further cause the system to:
  in response to determining modifications to schedules in response to selection of a schedule change option:
    determine updates to the one or more indications of instances of the metric; and
    update at least the first user interface portion to indicate the updates to the updates to the one or more indications.

20. A computer program product comprising a computer readable storage medium having program instructions embodied therewith, the program instructions executable by one or more processors to cause the one or more processors to:
  receive schedule data and metric data, wherein the schedule data indicates at least a schedule of a set of items, and wherein the metric data indicates at least events related to the set of items;
  generate user interface data useable for rendering an interactive graphical user interface, the interactive graphical user interface including at least:
    a first user interface portion including at least a plurality of timelines indicating at least a portion of the schedule and based at least in part on a subset of the schedule data associated with a subset of the set of items; and
    one or more indications of instances of a metric from the metric data, wherein the one or more indications are spatially located adjacent to timelines of items to which the respective instances of the metric may relate, and wherein the one or more indications are configured to provide a visual representation of whether or not the respective instances of the metric are associated with parts of timelines of items; and
  in response to receiving one or more modifications to the schedule of the set of items via one or more of the timelines of the items, update and cause display of the interactive graphical user interface indicating an update to the visual representation.

* * * * *